United States Patent
Harris, Jr. et al.

(10) Patent No.: US 6,463,882 B1
(45) Date of Patent: Oct. 15, 2002

(54) GROWING MARINE FISH IN FRESHWATER

(75) Inventors: H. William Harris, Jr., Portland; David R. Russell, Alfred; Jacqueline Nearing, N. Yarmouth; Marlies Betka, Portland, all of ME (US)

(73) Assignee: MariCal, LLC, Portland, ME (US)

( * ) Notice: Subject to any disclaimer, the term of this patent is extended or adjusted under 35 U.S.C. 154(b) by 154 days.

(21) Appl. No.: 09/687,373

(22) Filed: Oct. 12, 2000

(51) Int. Cl.[7] ............................................. A01K 61/00
(52) U.S. Cl. .................... 119/230; 119/231; 119/215
(58) Field of Search ................................ 119/230, 231, 119/215; 426/2

(56) References Cited

U.S. PATENT DOCUMENTS

| | | | |
|---|---|---|---|
| 3,406,662 A | * 10/1968 | Vik et al. .................. | 119/217 |
| 3,777,709 A | * 12/1973 | Anderson et al. ........... | 119/217 |
| 4,703,008 A | 10/1987 | Lin ......................... | 435/240.2 |
| 5,128,130 A | * 7/1992 | Axelrod ..................... | 119/230 |
| 5,351,651 A | 10/1994 | Ushio et al. ............... | 119/231 |
| 5,688,938 A | 11/1997 | Brown et al. ............... | 536/23.5 |
| 5,763,569 A | 6/1998 | Brown et al. ............... | 530/324 |
| 5,858,684 A | 1/1999 | Nemeth et al. .............. | 435/7.2 |
| 5,962,314 A | 10/1999 | Brown et al. ............... | 435/320 |
| 5,981,599 A | 11/1999 | Moe et al. .................. | 514/654 |
| 6,001,884 A | 12/1999 | Nemeth et al. .............. | 514/699 |
| 6,016,770 A | * 1/2000 | Fisher ....................... | 119/215 |

FOREIGN PATENT DOCUMENTS

| | | |
|---|---|---|
| EP | 0801904 A1 | 4/1997 |
| WO | WO 97/35977 | 3/1997 |
| WO | WO 97/35977 | 10/1997 |
| WO | WO 98/15627 | 4/1998 |
| WO | WO 00/64274 | 4/1999 |

OTHER PUBLICATIONS

Kyodo News Service, New 'water' allows freshwater, saltwater fish to coexist, Japan Economic Newswire (Aug. 4, 1994).*

Gatlin, D. M., et al., "Effects of Dietary Sodium Chloride on Red Drum Juveniles in Waters of Various Salinities," *The Progressive Fish Culturist*, 54:220–227 (1992).

Park, G., et al., "The Effects of Residual Salts and Free Amino Acids in Musid Meal on Growth of Juvenile Japanese Flounder *Paralichthys olivaceus*", Nippon Suisan Gakkaishi, 66(4): 697–704 (2000). Abstract in English.

Nearing, J, et al., "Cloning and expression of a homologue of the calcium (Ca2+) /polyvalent cation receptor (CaR) protein that acts as a magnesium (Mg2+) sensor in dogfish shark (*Squallus acanthias*) kidney." *Journal of The American Society of Nephrology*, 8: 40A. (From ASN Program and Abstracts, 1997, Abstract No. A0194) (1997).

(List continued on next page.)

*Primary Examiner*—Robert P. Swiatek
*Assistant Examiner*—F Chad Copier
(74) *Attorney, Agent, or Firm*—Hamilton, Brook, Smith & Reynolds, P.C.

(57) ABSTRACT

The invention relates to methods, compositions and kits for raising marine fish in freshwater. The methods involve adding at least one Polyvalent Cation Sensing Receptor (PVCR) modulator to the freshwater in an amount sufficient to increase expression and/or sensitivity of at least one PVCR; and adding feed for fish consumption to the freshwater, wherein the feed comprises an amount of NaCl sufficient to contribute to a significant increased level of the PVCR modulator in serum of the marine fish.

16 Claims, 24 Drawing Sheets

OTHER PUBLICATIONS

Sands, J. M., et al., "An extracellular calcium/polyvalent cations–sensing receptor (CaR) localized to endosomes containing aquaporin 2 water channels modulates vasopressin–elicited water permeabiity in rat kidney inner medullary collecting duct," *J Clinical Investigation* 99: 1399–1405 (1997).

Ward, D. T., et al., "Disulfide–bonds in the Extracellular Calcium–polyvalent Cation Sensing Receptor Mediate Dimer Formation and its Response to Divalent Cations in Vitro," *J. Biol. Chem.* 273: 14476–14483 (1998).

Riccardi, D., et al., "Cloning and Functional Expression of a Rat Kidney Extracellular Calcium/Polyvalent CationSensing Receptor," *Proc. Natl. Acad. Sci. USA* 92:131–135 (1995).

Zaugg, W.S., et al., "Increased Seawater Survival And Contribution To The Fishery of Chinook Salmon (*Oncorhynchus tshawytscha*) By Supplemental Dietary Salt," *Aquaculture*, 32: 183–188 (1983).

Shaw, H.M., et al., "Effect of Dietary Sodium Chloride on Growth of Atlantic Salmon (*Salmo salar*)," *J. Fish. Res. Board Can.*, 32(10) 1813–1819 (1975).

MacLeod, M.G., "Relationships Between Dietary Sodium Chloride, Food Intake and Food Conversion in the Rainbow Trout," *J. Fish Biol.*, 13: 73–78 (1978).

Stickney, R. R., "Nonconservative Aspects of Water Quality; Conservative Aspects of Water Quality and Physical Aspects of the Culture Environment; and Feed, Nutrition, and Growth. (Chapters 4, 5, 6." In Principles of Aquaculture, (John Wiley & Sons, Inc.), pp. 146–351 (1994).

Folmar, Leroy C. and Dickhoff, Walton W., "The Parr–Smolt Transformation (Smoltification) And Seawater Adaptation In Salmonids," *Aquaculture*, 21: 1–37 (1980).

Williams, S., et al., "A comparison of underyearling growth and smoltification between hatchery reared Maine landlocked Atlantic salmon, *Salmo salar*, and a commercially available strain of Norwegian *Salmo salar*." *World Aquaculture Association Book of Abstracts*, p. 584 (1998).

Brown, E.M., et al., "A comparison of the effects of divalent and trivalent cations on parathyroid hormones release," *Endocrinol.*, 127:1064–1071 (1990).

Ward, P.T. et al., "Disulfide Bonds in the Extracellular Calcium–polyvalent Cation–sensing Receptor Correlate with Dimer Formation and its Response to Divalent Cations in Vitro," *Am Soc. Biochem. Mol. Bio.*, 272:23; 14478–14483 (1998).

Forsberg, James A., et al., "Survival and Growth of Red Drum *Sciaenops ocellatus* in Saline Groundwaters of West Texas, USA," *Journal of the World Aquaculture Society*, 27(4): 462–474 (1996).

Garrett, J.E., et al., "Molecular Cloning and Functional Expression of Human Parathyroid Calcium Receptor cDNAs," *The Journal of Biological Chemistry*, 270(21):12919–12925 (1995).

Brown, E.M., et al., "Cloning and Characterization of an Extracellular $Ca^{2+}$–Sensing Receptor from Bovine Parathyroid," *Nature*, 366:575–580 (1993).

Grau, E.G., et al., "Lunar phasing of the thryoxin surge preparatory to seaward migration of salmonid fish," *Science* 211(4482): 607–609 (1981).

Hedemann, L., et al., "The Familial Magnesium–losing Kidney," *Acta Med Scand* 219(1):133–6 (1986).

Young, B., et al., "Smoltification and seawater adaptation in coho salmon (*Oncorhynchus kisutsch*): plasma prolactin, growth hormone thyroid hormones and coritsol," *Gen. Comp. Endocrinology*, 74: 335–345 (1989).

Zaugg, W.S., et al., "Changes in Gill adenosine–triphosphatase activity associated with parr–smolt transformation in stellhead trout, coho and spring chinook salmon," *J.. Fish. Res. Bd. Can.*, 29(2): 167–171 (1972).

Holmes, W. N., et al., "The Body Compartments and the Distribution of Electrolytes," *Fish Physiology*, 1: 1–88 (1969).

Clarke, W.C., et al., "A seawater challenge test to measure smolting in juvenile salmon." *Fisheries and Marine Service Research Dir. Tech. Report* 705, Ottawa (1977).

Preston, Gregory M., "Polymerase Chain Reaction with Degenerate Oligonucleotide Primers to Clone Gene Family Members," In *Methods in Molecular Biology, vol. 58: Basic DNA and RNA Protocols*, A. Harwood, eds. (NJ: Humana Press Inc.) Chapter 36,pp. 303–312 (1993).

Usher, M.L., et al., "Intestinal Water Transport in Juvenile Atlantic Salmon (*Salmo salar L.*) During Smolting and Following Transfer to Seawater," *Comp. Biochem. Physiol.*, 100A(4): 813–818 (1991).

Salman, N.A., and Eddy, F.B., "Kidney Function in Response to Salt Feeding in Rainbow Trout (*Salmo gairdneri richardson*)," *Comp. Biochem. Physiol.*, 89A(4): 535–539 (1988).

Nilssen, K.J., et al., "Summer osmoregulatory capacity of the world's northermost living salmonid," *Am. J. Physiol.*, 272: R743–R749 (1997).

Siner, J., "Cloning of an Aquaporin Homologue Present in Water Channel Containing Endosomes of Toad Urinary Bladder," *Am. J. Physiol.*, 270:C372–C381 (1996).

Targovnik, J.H., et al., "Regulation of Parathyroid Hormone Secretion in Vitro: Quantitative Aspects of Calcium and Magnesium Ion Control," *Endocrinology* 88:1477–1482 (1971).

Taufield, P.A., et al., "Hypocalciuria in Preeclampsia," *N Engl J Med* 316(12):715–718 (1987).

Yamagami, K., et al., "Molecular and Cellular Basis of Formation, Hardening, and Breakdown of the Egg Envelope and Fish," *International Review of Cytology*, 136:51–92 (1992).

Spellman, P.T., et al., "Comprehensive Identification of Cell Cycle–regulated Genes of the Yeast *Saccharomyces cerevisiae* by Microarray Hybridization," *Molecular Biology of the Cell*, 9: 3273–3297 (1998).

Smith, L.C., "Anatomy and Special Physiology of Salmonids." in *Fish Medicine*, M.K. Stoskopf, eds. (WB Saunders), Chapter 31: 321–327 (1993).

Guo, L., et al., "extracellular $Ca^{2+}$ Increases Cytosolic Free $Ca^{2+}$ in Freshly Isolated Rat Odontoblasts," *J. Bone Miner Res.*, 14: 1357–1366 (1999).

Zadunaisky, J.A., et al., "Osmolarity and Cell Volume Changes of Chloride Cells: The Nature of the Rapid Signal for Adaptation to Salinities of *Fundulus heteroclitus*," *Bull. MDI Biol. Lab.*, 32:152–156 (1992).

Cole, et al., "Isolation and Characterization of Pleurociden, an Antimicrobial Peptide in the Skin Secretions of Winter Flounder," *J. Biol. Chem.* 272:12008–12013 (1997).

Forster, R. P., et al., "Formation of excretory products," Chapter 5 of Fish Physiology, Academic Press, New York, NY, pp. 313–345 (1969).

Elger, E.B. et al., "Adaption of renal function to hypotonic medium in winter flounder," *J. Comp. Physio.* B157:21–30 (1987).

Bai, M., et al., "Expression and characterization of inactivating and activating mutations in human $Ca^{2+}$ Sensing Receptor," *J. Biol. Chem.*, 32:19537–19545 (1996).

Evans, D.H., "Osmotic and Ionic Regulation," Chapter 11 in *The Physiology of Fishes*, (CRC Press, Boca Raton, FL) pp. 315–341 (1993).

Prunet, P., et al., "Effects of growth hormone on gill chloride cells in juvenile Atlantic salmon (*Salmo salar*)," *Am. J. Physiol.*, 266: R850–R857 (1994).

Naito, T. et al. "Putative pheromone receptors related to the $Ca^{2+}$–sensing receptor in Fugu," *Proc. Natl. Acad. Sci.*, 95:5178–5181 (Apr. 1998).

Hew, C.L., Antifreeze Protein Gene Transfer in Atlantic Salmon, *Molecular Marine Biology and Biotech.*, 1(4/5): 309–317 (1992).

Ryba, N.J., et al., "A New Multigene Family of Putative Pheromone Receptors," *Neuron*, 19(2):371–379 (1997).

Yamaguchi, Toru, et al., "G Protein–Coupled Extracellular $Ca^{2+}$ ($Ca^{2+}_{o}$.)—Sensing Receptor (CaR): Roles in Cell Signaling and Control of Diverse Cellular Functions." In *Advances in Pharmacology,Hormones and Signaling*, Bert w. O'Malley, et al., eds. (Academic Press) 48: 209–253 (2000).

Zaidi, M., et al., "Emerging insights into the role of calcium ions in osteoclast regulation," *J. Bone Miner Res.*, 14: 669–674 (1999).

Mykles, Donald L., "Proteolytic Processes Underlying Molt–Induced Claw Muscle Atrophy in Decapod Crustaceans." *Amer. Zool.*, 39: 541–551 (1999).

Borgatti, A.R., et al., "Gill (NA+K+) ATPase involvement and regulation during salmonid adaptation to salt water," *Comp. Biochem. Physiol.* 102: 637–643 (1992).

Frenkel, Y., et al., "Hypocalciuria of Preeclampsia Is Independent of Parathyroid Hormone Level," *Obstetrics & Gynecology*, 77(5):689–691 (1991).

Kawamura, T., and Yamashira, S., "Chemical Sensitivity of Lateral Line Organs in the Goby. Gobus Giurinus," *Comp. Biochem, Physiol.*, 72A: 253–257 (1981).

Fauci, A.S., et al., "Cardinal Manifestations and Presentation of Diseases," *Principles of Internal Medicine*, 14th Edition:p. 260 (1998).

Stahl, Christopher J., et al., "Optimization of Dissolved Solids for the Intensive Culture of Juvenile Red Drum *Sciaenops ocellatus*," *Journal Of the World Aquaculture Society*, 26(3): 323–326 (1995).

Forsberg, James A., and Neill, William H., "Saline Groundwater As An Aquaculture Medium: Physiological Studies On The Red Drum, *Sciaenops ocellatus*," *Environmental Biology of Fishes.*, 49: 119–128 (1997).

Xu, B., et al., "Osmoregulatory Actions of Growth Hormone In Juvenile Tilapia (*Oreochromis niloticus*)," *Fish Physiology and Biochemistry*, 17: 295–301 (1997).

Rydevik, Magnus, et al., "Plasma Growth Hormone Levels Increase During Seawater Exposure of Sexually Mature Atlantic Salmon Parr (*Salmo salar L.*)," *General and Comparative Endocrinololgy*, 80: 9–15 (1990).

Walton, M. J., et al., "The effects of dietary tryptophan levels on growth and metabolism of rainbow trout (*Salmo gairdneri*)," *The British Journal of Nutrition* 51: 279–287 (1984).

Veldhuis, J. D., et al., "Divergent Influences of Calcium Ions on Releasing Factor–Stimulated Anterior Pituitary Hormone Secretion in Normal Man," *Journal of Clinical Endocrinology and Metabolism*, 59(1): 56–61. (1984).

Gamba, G., et al., Primary Structure and Fuctional Expression of a cDNA Encoding the Thiazide–Sensitive, Electroneutral Sodium–Chloride Cotransporter, *Proc. Natl. Acad. Sci. 90*:2749–2753 (1993).

Gardner, W.D., et al., "Gentiourinary System." In *Structure of the Human Body*, (W.B. Saunders Company) pp. 365–366 (1967).

El–Mowafi, A.F.A., et al., "Magnesium requirement of Atlantic salmon (*Salmo salar L.*) Parr in seawater–treated fresh water," *Aquaculture Nutrition*, 4(1) 31–38(1998).

Conigrave, A.D., et al., "L–Amino acid sensing by the extracellular $Ca^{2+}$—sensing receptor." *Proc Natl Acad Sci*, 97(9) 4419–4819 (2000).

Ogino, Chinkichi, and Chiou, Jiing Y., "Mineral Requirements in Fish–II Magnesium Requirement of Carp," *Bulletin of the Japanese Society of Scientific Fisheries*, 41(1): 71–75 (1976).

Raloff, J., "Downtown Fisheries? Advances May Make Fish Farming a Healthy Prospect, Even For Inner Cities," *Science News*, 157(20): 314–316 (2000).

Folmar, L.C. et al., "Evaluation of some physiological parameters as predictive indices of smoltification," *Aquaculture* 23: 309–324 (1981).

Alberts, B., et al., "Cell Junctions, Cell Adhesion, and the Extracellular Matrix." In *Molecular Biology of The Cell*, 3rd . ed., (Garland Publishing), pp. 950–954 (1994).

Baum, M. A., et al., "Recent Insights Into the Coordinate Regulation of Body Water and Divalent mineral Ion Metabolism," *The American Journal of the Medical Sciences.*, 316(5): 321–328 (1998).

Brown, E. M., et al., "Neomycin Mimics the Effects of High Extracellular Calcium Concentrations on Parathyroid Function in Dispersed Bovine Parathyroid Cells," *Endocrinology*,128(6):3047–3054 (1991).

Wendelaar Bonga, S., et al., "The Stress Response in Fish," *Physiological Reviews*, 77(3): 591–625 (1997).

Elger, B. , et al., "Effect of adrenergic blockade with bretylium and phentolamine on glomerular filtration rate in the rainbow trout, *Salmo gairdneri* Rich., adapting to saline water," *J. Biochem. Physiol.*, C. 75: 253–258 (1983).

Chen, T. T., et al., "Transgenic fish," *Trends in Biotechnology*, 8: 209–215 (1990).

Chattopadhyay, N., et al., "Calcium–sensing receptor in the rat hippocampus: a developmental study," *Developmental Brain Research*, 100 pp. 13–21 (1997).

Marshall, W.S., "On the involvment of mucous secretion in teleost osmoregulation," *Can. J. Zool.*, 56: 1088–1091 (1978).

Dabrowska, H., et al., "Magnesium status in freshwater fish, common carp (*Cyprinus carpio*, L.) And the dietary protein–magnesium interaction," *Fish Physiology and Biochemistry*, 9(2) 165–172 (1991).

Fuleihan, G. E., et al., "Calcium Modulation of Adrenocorticotropin Levels in Women–A Clinical Research Center Study," *The Journal of Clinical Endocrinology & Metabolism*, 81(3): 932–936 (1996).

Darnell, J., et al., "The Plasma Membrane," Chapter 13 in *Molecular Cell Biology*, 516–520 (1990).

Davenport, J., "Synopsis of Biological Data on the Lumpsucker," *Food and Agriculture Organization of the United Nations*, Synopsis No. 147, pp. 1–19 (1985).

Hocking, P.J., "Effects of Sodium and Potassium Chlorides on the Growth and Accumulation of Mineral Ions by *Cyperus involucratus* Rotto," *Aquatic Botany*, 21: 201–217 (1985).

Howells, G.D., et al., "Effects of Acidity, Calcium, and Aluminium on fish Survival and Productivity–A Review," *J. Sci. food Agric.* 34: 559–570 (1983).

Köhl, K.I., "The effect of NaCl on growth, dry matter allocation and ion uptake in salt marsh and inland populations of *Armeria maritima*," The New Phytologist, 135: 213–225 (1997).

Looby, D., et al., "Immobilization of animal cells in porous carrier culture," *Trends in Biotechnology*, 8(8): 204–209 (1990).

Lee, Sang–Min, et al., "Influence of P, Ca, Zn, Mg, Fe, K, Mn, or Se in the Dietary Mineral Premix on Growth and Body Composition of Korean Rockfish (*Sebastes schlegeli*)," *J. Korean Fish Society*, Abstract in English, 31(2): 245–251 (1998).

Leatherland, J.F., et al., "Effect of Dietary Mirex and PCBs On Calcium and Magnesium Metabolism in Rainbow Trout, . . . ," *Comparative Biochemistry and Physiology*, 69C: 345–351 (1981).

Weatherley, A.H., et al., "Growth." In *Physiological Ecology of Pacific Salmon*, Groot, C. et al., eds. (UBC Press/Vancouver), pp. 103–158 (1995).

Mount, D.R., et al., "Effect of Long–Term Exposure to Acid, Aluminum, and Low Casium on Adult Brook Trout (*Salvelinus fontinalis*). 2. Vitellogenesis and Osmoregulation," *Canadian Journal of Fisheries and Aquatic Sciences*, 45(9):1633–1642 (1988).

Naito, T., et al., "Putative pheromone receptors related to the $Ca^{2+}$–sensing receptor in Fugu," *Proc. natl. Acad. Sci.*, 95: 5178–5181 (1998).

Norris, D.O., "Endocrine Regulation of Iono–Osmotic Balance in Teleosts," Chapter 16 in *Vertebrate Endocrinology*, Lea and Fabiger, eds. (Philadelphia, PA) pp. 425–443 (1985).

Nemeth, E.F., et al., "Calcimimetics with potent and selective activity on the parathyroid calcium receptor," *Proc. Natl. Acad. Sci.*, 95: 4040–4045 (1998).

Evans, G.H., et al., "Association of Magnesium Deficiency with the Blood Pressure–Lowering Effects of Calcium," *Journal of Hypertension*, 8(4):327–337 (1990).

Parry, G., "Size and Osmoregulation in Salmonid Fishes," *Nature*, 181(4617): 1218–1219 (1958).

Quinn, S. J. , et al., "The $Ca^{2+}$–sensing receptor: a target for polyamines," *American Journal of Physiology*, 273(4): C1315–C1323 (1997).

Renfro, J. L., et al., "Water and ion transport by the urinary bladder of the teleost *Pseudopleuronectes americanus*," *American Journal of Physiology*, 228(1): 52–61 (1995).

Veillette, P.A., et al., "Cortisol Mediates the Increase in Intestinal Fluid Absorption in Atlantic Salmon During Parr––Smolt Transformation," *General and Comparative Endocrinology*, 97: 250–258 (1995).

Rogers, K.V., et al., "Localization of calcium receptor mRNA in the adult rat central nervous system by in situ hybridization," *Brain Research* ,744(1): 47–56 (1997).

Ruat, M., et al., "Calcium sensing receptor: Molecular cloning in rat and localization to nerve terminals," *Proc. Natl. Acad. Sci.*, (92): 3161–3165 (1995).

Anast, C.S., et al., "Evidence for Parathyroid Failure in Magnesium Deficiency," *Science*, 177: 606–608 (1972).

Satoh, S., et al., "Effects on Growth and Mineral Composition of Carp of Deletion of Trace elements of Magnesium from Fish Meal Diet," *Bulletin of the Japanese Society of Scientific Fisheries*, 49(3): 431–435 (1983).

Shehadeh, Z.H., et al., "The Role of the Intestine in Salinity Adaptation of the Rainbow Trout, Salmo Gairdneri," *Comp. Biochem. Physiol.*, 30: 397–418 (1969.).

Simpson, J.B., et al., "Subfornical organ lesions reduce intravenous angiotensin–induced drinking," *Brain Research*, 88: 154–161 (1975).

Siner, J., et al., "Cloning of an aquaporin homologue present in water channel containing endosomes of toad urinary bladder," *Am. J. Physiol.*, 270 (*Cell Physiol. 39*): C372–C381 (1996).

Stradmeyer, L., "Smolts—Is feeding 'non–starters' a waste of time?," *Fish Farmer*, pp. 12–13 (1991).

Tacon, A.G.J., et al., "Effect of Different dietary Levels of Salt–mixtures on Growth and Body Composition in Carp," *Bulletin of the Japanese Society of Scientific Fisheries*, 50(7): 1217–1222 (1984).

Du, S.J., et al., "Growth Enhancement in Transgenic Atlantic Salmon by the Use of an "All Fish" Chimeric Growth Hormone Gene Construct," *Bio/Technology* 10:176–181 (1992).

Usher, M.L., et al., "Effects of transfer to seawater on growth and feeding in Atlantic salmon smolts (*Salmo salar L.*)," *Aquaculture*, 94: 309–326 (1991).

Lonning, S., et al., "A Comparative Study of Pelagic and Demersal Eggs from Common Marine Fishes in Northern Norway," *Sarsia*, 73:49–60 (1988).

Norris, D.O., "Endocrine Regulation of Iono–Osmotic Balance in Teleosts," Chapter 16 in *Vertebrate Endocrinology*, Lea and Fabiger, eds. (Philadelphia, PA) pp. 425–443 (1985).

Ward, D. T., et al., "Disulfide bonds in the Extracellular Calcium–Polyvalent Cation–sensing Receptor Correlate with dimer formation and Its Response to Divalent Cations in Vitro," *The Journal of Biological Chemistry*, 275(23): 14476–14483 (1998).

Willoughby, S., "Production Life Cycle." In *Manual of Salmonia Farming*. Blackwell Science Ltd., eds., (Fishing News Books), pp. 82–122 (1999).

Van Der Velden, J.A., et al., "Growth rate and tissue magnesium concentration in adult freshwater tilapia, *Oreochromis mossambicus* (Peters), fed diets differing in magnesium content," Journal of Fish Biology, 39: 83–91 (1991).

Zadunaisky , J.A., et al., "Osmolarity and Cell volume Changes of Chloride Cells: The Nature of the Rapd signal for Adaptation to Salinities of Fundulus Heteroclitus," *Biological Labs*, 32: 152–156 (1995).

Yanez, J. R., et al., "The neuronal system of the saccus vasculosus of trout (*Salmo trutta fario* and *oncorhynchus mykiss*): an immunocytochemical and nerve tracing study," *Cell Tissue Res.*, 288: 497–507 (1997).

Renfro. K. J., "Relationship between renal fluid and Mg secretion in a glomerular marine teleost." *Am. J. Physiol* 238: F92–F98 (1980).

Harmin, S. A., et al., "Plasma sex steroid profiles and the seasonal reproductive cycle in male and female winter flounder, *Pleuronectes americanus*," *Marine Biology* 121: 601–610 (1995).

Wendelarr Bonga, S. E. W., et al., "Endocrinology, Chapter 15." In *The Physiology of Fishes*, DH. Evans, eds., (CRC Press Inc.) pp. 469–534 (1993).

Mayer–Gostan, M., et al., "Mechanisms of hormone actions on gill transport in Vertebrate Endocrinology," In *Fundamentals and Medical Implications*, PKT Pang, et al., eds., (Academic Press) 2: 211–246 (1987).

Madsen, S.S., "The Role of Cortisol and Growth Hormone in Seawater Adaptation and Development of Hypoosmoregulatity Mechanisms in Sea Trout Parr," *Gen. Comp. Endocrinology*, 79: 1–23 (1990).

Hirano, T., "The Spectrum of Prolactin Actions in Teleosts." In *Comparative Endocrinology, Developments and Directives*, CL Ralph, eds., (Alan Liss, Inc.) pp. 53–61 (1986).

Wendelaar Bonga, S., et al., "Control of Calcium regulating hormones in vertebrates: paranthroid hormone, calcitonin, prolactin and stanniocalcin," *Int. Rev. Cytol.*, 128: 139–149 (1991).

Wendlaar Bonga, S., et al., "Pituitary hormones, in Vertebrate Endocrinology." *In Fundamentals and Biochemical Implications*, 3: 105–124 (1989).

Forserg, J.A., et al., "Survival and growth of red drum in saline groundwaters of west Texas, USA," *J. of World Aquaculture Society* 27: 462–474 (1966).

Gatlin, D.M., et al., "Effects of dietary sodium chloride on red drum juveniles in waters of various salinities," *The Prog. Fish–Culturist*, 54: 220–227 (1992).

Shearer, K.D., "Dietary potassium requirement of juvenile chinook salmon," *Aquaculture*, 73: 119–129 (1988).

Brown, E.M., et al., "Calcium–Ion–Sensing Cell–Surface Receptors," *The New England Journal of Medicine*, 33(4):234–240 (1995).

Iyer, V.R., et al., "The Transcriptional Program in the Program in the Response of Human Fibroblasts to Serum," *Science*, 283: 83–87 (1999).

Quinn, S.J., et al., "Sodium and ionic strength sensing by the calcium receptor," *J. Biol. Chem.*, 273(31): 19579–19586 (1998).

Brown, A.J., et al., "Rat calcium–receptor is regulated by vitamin D but not by calcium," *Am. J. Physiol.*, 270: F454–F460 (1996).

Olszak, I., et al., "Extracellular calcium elicits a chemokinetic response from monocytes in vitro and in vivo," *J. Clin. Invest.*, 105(9): 1299–1305 (2000).

Plotkin, M.D., et al., "Localization of the Thiazide Sensitive NA–CL Cotransporter (TSC) in the Mammalian Kidney," *J. Am. Soc. Nephrol.*, 6:349A Abstract No.: 1717(1995).

Knox, D., et al., "Studies on the nutrition of rainbow trout (*Salmo gairdneri*)," *British Journal of Nutrition*, 50: 121–127 (1983).

House, M.G., et al., "Expression of an extracellular calcium–sensing receptor in human bone marrow cells," *J. Bone Mineral Res.*: 12: 1959–1970 (1997).

Anh, D.J., et al., "Skeletal alkaline phosphatase activity is primarily released from human ossteoblasts in an insoluble form, and the net release is inhibited by calcium and skeletal growth factors," *Calcif Tissue In.*: 62: 332–340 (1998).

Bornefalk, E., et al., "Regulation of interleukin–6 secretion from mononuclear blood cells by extracellular calcium," *J. Bone Miner. Res.*, 12: 228–233 (1997).

Nielsen, P. K., et al., "Inhibition of PTH secretion by interleukin–1 beta in bovine parathyroid glands in vitro is associated with an up–regulation of the calcium–sensing receptor mRNA," *Biochem Biophys Res Commun.*, 238: 880–885 (1997).

Chang, W., et al., "Calcium Sensing in Cultured Chondrogenic RCJ3. 1c5.18 Cells," *Endocrinology* 140: 1911–1919 (1999).

Eklou–Kalonji, E., et al., "Effects of extracellular calcium on the proliferation and differentiation of porcine osteoblasts in vitro," *Cell Tissue Res.*, 292: 163–171 (1998).

Emanuel, R. L., et al., "Calcium–sensing receptor expression and regulation by extracellular calcium in the atT–20 pituitary cell line," *Mol Endocrinology*, 10: 555–565 (1996).

Godwin, S.L., et al., "Extracellular calcium and platelet-derived growth factor promote receptor–mediated chemotaxis in osteoblasts through different signaling pathways," *J. Biol. Chem.*, 272(17): 11307–11312 (1997).

Gundberg, C.M., et al., "Acute changes in serum osteocalcin during induced hypocalcemia in humans," *J. Clin. Endocrinology Metabolism*, 72: 438–443 (1991).

Honda, Y., et al., "Effects of extracellular calcium on insulin-like growth factor II in human bone cells," *J. Bone Miner Res.*, 10: 1660–1665 (1995).

Jin, H.J., et al., "Fusion of mouse alveolar macrophages induced by 1–alpha, 25–dihydroxyvitamin D3 involves extracellular, but not intracellular, calcium," *J. Cell. Physiol.*, 142: 434–439 (1990).

Kanatani, M., et al., "Effect of elevated extracellular calcium on the proliferation of osteoblastic MC3T3–E1 cells: its direct and indirect effects via monocytes," *Biochem. Biophys. Res. Commun.*, 181: 1425–1430 (1991).

Kanatani, M., et al., "High extracellular Calcium Inhibits Osteoclast–like Cell formation by Directly Acting on the Calcium–Sensing Receptor Existing in Osteoclast Precursor Cells," *Biochem. Biophys. Res. Commun.*, 261: 144–148 (1999).

Lajeunesse, D., et al., "Regulation of osteocalcin secretion by human primary bone cells and by the human osteosarcoma cell line MG–63," *Bone Miner*, 14: 237–250 (1991).

Malgaroli, A., et al., "Control of cytosolic free calcium in rat and chicken osteoclasts. The role of extracellular calcium and calcitonin," *J. Biol. Chem.*, 264: 14342–14349 (1989).

Quarles, L.D., "Cation–sensing receptors in bone: A novel paradigm for regulating bone remodeling?," *J. Bone Miner. Res.*, 12: 1971–1974 (1997).

Sugimoto, T., et al., "Effects of high calcium concentration on the functions and interactions of osteoblastic cells and monocytes and on the formation of osteoclast–like cells," *J. Bone Miner Res.*, 8: 1445–1452 (1993).

Yamaguchi, T., et al., "Extracellular Calcium ($Ca2+_o$) sensing Receptor in a Murine Bone Marrow–Derived Stromal Cell Line (ST2): Potential Mediator of the Actions of $Ca2+_o$ on the Function of ST2 Cells," *Endocrinology*, 139: 3561–3568 (1998).

Yamaguchi, T., et al., "Mouse osteoblastic cell line (MC3T3–E1) expresses extracellular calcium (Ca2+o) sensing receptor and its agonists stimulate chemotaxis and proliferation of MC3T3–E1 cells," *J Bone Miner Res.*, 13: 1530–1538 (1998).

Yamaguchi, T., et al., "Extracellular calcium (Ca2+o) –sensing receptor in a mouse monocyte–macrophage cell line (J774): Potential mediator of the actions of Ca2+o on the function of J774 cells," *J Bone Miner Res.*, 13: 1390–1397 (1998).

Yamaguchi, T., et al., "Expression of extracellular calcium (Ca2+o) –sensing receptor in human peripheral blood monocytes," *Biochem. Biophys. Res. Commun.*, 246: 501–506 (1998).

Roberts, J.M., "Prevention or Early Treatment of Preeclampsia," *The New England Journal of Medicine* 337:124–125 (1997).

Rokaw, M., et al., "Rapamycin (RAP) Stimulates Sodium Transport in A6 Cells Through Inhibition of Protein Kinase C (PKC)," *J. Am. Soc. Nephrol* 6:349A (1995).

Cim, R. R., et al., "Identification and functional assay of an extracellular calcium–sensing receptor in Necturus gastric mucosa," *American Journal of Physiology* 273: G1051–G1060 (1997).

Sands, A.T., et al., "High Susceptibility to Ultraviolet–Induced Carcinogenesis in Mice Lacking XPC," *Nature* 377:162–165 (1995).

Ramos, L.S., et al., "Urinary Calcium As an Early Marker for Preeclampsia," *Obstetrics & Gynecology*, 77(5):685–688 (1991).

Saksena, D.N., "Histopathology of the saccus vasculosus of the Indian freshwater goby glossobisu giuris Ham. (Teleostei). Folia Morphol. (Praha)," 37: 249–252 (1989).

Aida, K., et al., "Molecular Cloning of a Putative $Ca^{2+}$ Sensing Receptor cDNA from Human Kidney," *Biochemical and Biophysical Research Communications*, 214(2):524–529 (1995).

\* cited by examiner

```
cctgacaata ttcgcagtgc tgggagtctt gctgacggcc ttcgtcctag gggtgtttgc  60
ccgattccgc aacactccca tcgtgaaggc caccaaccgg gagctgtcct acctcctcct 120
cttctccctg gtctgctgct tctccagctc tcttatgttc atcggtgaac cccaggactg 180
gacgtgccgc ctgcgccagc cggccttcgg gatcagcttc gtcctctgca tctcctgcat 240
cctggtcaag accaaccgcg tgctgctcgt cttcgaggcc aagatcccca ccagtctcca 300
ccgcaagtgg tggggcctga acctgcagtt cttgctggtg ttcctgtgca ccttcgtcca 360
ggtgatgatt tgcgtggtct ggctctacaa cgccccgccg gccagctcca agaaccacga 420
catcgatgag atcatcttca tcacctgcaa cgagggctcc atgatggccc tgggctttct 480
gatcggctac acctgtctcc ttgccgccat ttgcttcttc ttcgcgttca aatcgcgcaa 540
actcccggag aacttcacag aggcgaagtt catcacgttt agcatgctga tatt        594
```

```
Leu Thr Ile Phe Ala Val Leu Gly Val Val Leu Thr Ala Phe Val Met
 1               5                  10                  15
Gly Val Phe Val Arg Phe Arg Asn Thr Pro Ile Val Lys Ala Thr Asn
                20                  25                  30
Arg Glu Leu Ser Tyr Leu Leu Leu Phe Ser Leu Val Cys Cys Phe Ser
            35                  40                  45
Ser Ser Leu Met Phe Ile Gly Glu Pro Gln Asp Trp Thr Cys Arg Leu
        50                  55                  60
Arg Gln Pro Ala Phe Gly Ile Ser Phe Val Leu Cys Ile Ser Cys Ile
65                  70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
            100                 105                 110
Val Phe Leu Cys Thr Phe Val Gln Val Met Ile Cys Val Val Trp Leu
        115                 120                 125
Tyr Asn Ala Pro Pro Ala Ser Ser Lys Asn His Asp Ile Asp Glu Ile
    130                 135                 140
Ile Phe Ile Thr Cys Asn Glu Gly Ser Met Met Ala Leu Gly Phe Leu
145                 150                 155                 160
Ile Gly Tyr Thr Cys Ile Leu Ala Ala Ile Cys Phe Phe Phe Ala Phe
                165                 170                 175
Lys Ser Arg Lys Leu Pro Glu Asn Phe Thr Glu Ala Lys Phe Ile Thr
            180                 185                 190
Phe Ser Met Leu Ile
            195
```

FIG. 1

```
cctgacaata ttcgcagtgc tgggagtctt gctgacggcc ttcgtcctag gggtgtttgc  60
ccgattccgc aacactccca tcgtgaaggc caccaaccgg grgctgtcct acctcctcct 120
cttctccctg gtctgctgct tctccagctc tctaatgttc atcggcgaac cccaggactg 180
gacgtgccgt ctgcgccagc cggccttcgg gatcagcttc gtcctctgca tctcctgcat 240
cctggtcaag accaaccgcg tgctgctcgt cttcgaggcc aagatcccca ccagtctcca 300
ccgcaagtgg tggggcctga acctgcagtt cctgctggtg ttcctgtgca ccttcgtcca 360
ggtgatgatt tgygtggtct ggctctacaa cgccccgccg ccagctcca agaaccacga 420
cattgatgag atcatcttca tcacctgcaa cgagggctcc atgatggccc tgggctttct 480
gatcggctac acctgtctcc tcgccgccat ttgcttcttc ttcgcgttca aatcgcgcaa 540
actcccggag aacttcacag aggcgaagtt catcacgttc agcatgctga tatt        594
```

| | | | | | | | | | | | | | |
|---|---|---|---|---|---|---|---|---|---|---|---|---|---|
| Leu | Thr | Ile | Phe | Ala | Val | Leu | Gly | Val | Leu | Leu | Thr | Ala | Phe | Val | Leu |
| 1 | | | | 5 | | | | | 10 | | | | | 15 | |
| Gly | Val | Phe | Ala | Arg | Phe | Arg | Asn | Thr | Pro | Ile | Val | Lys | Ala | Thr | Asn |
| | | | 20 | | | | | 25 | | | | | 30 | | |
| Arg | Xaa | Leu | Ser | Tyr | Leu | Leu | Leu | Phe | Ser | Leu | Val | Cys | Cys | Phe | Ser |
| | | 35 | | | | | 40 | | | | | 45 | | | |
| Ser | Ser | Leu | Met | Phe | Ile | Gly | Glu | Pro | Gln | Asp | Trp | Thr | Cys | Arg | Leu |
| | 50 | | | | | 55 | | | | | 60 | | | | |
| Arg | Gln | Pro | Ala | Phe | Gly | Ile | Ser | Phe | Val | Leu | Cys | Ile | Ser | Cys | Ile |
| 65 | | | | | 70 | | | | | 75 | | | | | 80 |
| Leu | Val | Lys | Thr | Asn | Arg | Val | Leu | Leu | Val | Phe | Glu | Ala | Lys | Ile | Pro |
| | | | | 85 | | | | | 90 | | | | | 95 | |
| Thr | Ser | Leu | His | Arg | Lys | Trp | Trp | Gly | Leu | Asn | Leu | Gln | Phe | Leu | Leu |
| | | | 100 | | | | | 105 | | | | | 110 | | |
| Val | Phe | Leu | Cys | Thr | Phe | Val | Gln | Val | Met | Ile | Cys | Val | Val | Trp | Leu |
| | | 115 | | | | | 120 | | | | | 125 | | | |
| Tyr | Asn | Ala | Pro | Pro | Ala | Ser | Ser | Lys | Asn | His | Asp | Ile | Asp | Glu | Ile |
| | 130 | | | | | 135 | | | | | 140 | | | | |
| Ile | Phe | Ile | Thr | Cys | Asn | Glu | Gly | Ser | Met | Met | Ala | Leu | Gly | Phe | Leu |
| 145 | | | | | 150 | | | | | 155 | | | | | 160 |
| Ile | Gly | Tyr | Thr | Cys | Leu | Leu | Ala | Ala | Ile | Cys | Phe | Phe | Phe | Ala | Phe |
| | | | | 165 | | | | | 170 | | | | | 175 | |
| Lys | Ser | Arg | Lys | Leu | Pro | Glu | Asn | Phe | Thr | Glu | Ala | Lys | Phe | Ile | Thr |
| | | | 180 | | | | | 185 | | | | | 190 | | |
| Phe | Ser | Met | Leu | Ile | | | | | | | | | | | |
| | | | | 195 | | | | | | | | | | | |

Xaa=any amino acid

FIG. 2

```
gctgacaata ttcgccgtgc tcggcgtggt gctcacagcc ttcgtcatgg gggtgtttgt  60
ccgattccgc aacactccca tcgtgaaggc caccaacagg gagctgtcct acctgctcct 120
cttctccctc gtctgctgct tctccagctc cctcatgttc atcggcgaac cgcaggactg 180
gacgtgccgc ctccgccagc cggccttcgg catcagcttc gtcctctgca tctcctgcat 240
cttggtcaag accaaccgcg tgctgctcgt cttcgaggcc aagatcccca ccagcctcca 300
ccgcaagtgg tggggcttga acctgcagtt cctgctggtg ttcctgtgca cctttgtcca 360
ggtgatgatc tgcgtggtgt ggctgtacaa cgccccgccg gccagctcca agaaccacga 420
catcgatgag atcatcttca tcacctgcaa cgagggctcc atgatggccc tgggctttct 480
gatcggctac acttgcatcc tcgccgctat ctgcttcttc ttcgcgttca gtcgcgcaa 540
actccccgag aacttcacgg aggccaagtt catcacgttc agcatgctga tatt      594
```

```
Leu Thr Ile Phe Ala Val Leu Gly Val Val Leu Thr Ala Phe Val Met
 1           5                  10                 15
Gly Val Phe Val Arg Phe Arg Asn Thr Pro Ile Val Lys Ala Thr Asn
             20                 25                 30
Arg Glu Leu Ser Tyr Leu Leu Leu Phe Ser Leu Val Cys Cys Phe Ser
         35                 40                 45
Ser Ser Leu Met Phe Ile Gly Glu Pro Gln Asp Trp Thr Cys Arg Leu
     50                 55                 60
Arg Gln Pro Ala Phe Gly Ile Ser Phe Val Leu Cys Ile Ser Cys Ile
65                 70                 75                 80
Leu Val Lys Thr Asn Arg Val Leu Leu Val Phe Glu Ala Lys Ile Pro
             85                 90                 95
Thr Ser Leu His Arg Lys Trp Trp Gly Leu Asn Leu Gln Phe Leu Leu
            100                105                110
Val Phe Leu Cys Thr Phe Val Gln Val Met Ile Cys Val Val Trp Leu
            115                120                125
Tyr Asn Ala Pro Pro Ala Ser Ser Lys Asn His Asp Ile Asp Glu Ile
        130                135                140
Ile Phe Ile Thr Cys Asn Glu Gly Ser Met Met Ala Leu Gly Phe Leu
145                150                155                160
Ile Gly Tyr Thr Cys Ile Leu Ala Ala Ile Cys Phe Phe Phe Ala Phe
            165                170                175
Lys Ser Arg Lys Leu Pro Glu Asn Phe Thr Glu Ala Lys Phe Ile Thr
            180                185                190
Phe Ser Met Leu Ile
            195
```

FIG. 3

```
gttgaccata tgtgcggcgc tgggtgttgc cttgacaggc ttcgtgatgg ccgtctttgt  60
cagattccgc aacaccccca tagtgaaggc cacgaaccga gaactgtcct acgtcctcct 120
gttctctctc atctgttgct tctccagctc cctcatcttc ataggagagc cgcaggattg 180
gatgtgccgc ttacgccaac ctgcctttgg gatcagtttt gttctctgta tctcgtgcat 240
ccttgtcaaa acaaacagag tcctcttggt gtttgaagcc aagatcccta caagtctcca 300
tcgtaaaygg tggggttaa rcctacagtt cctgctggtg tttctgtgca catttgtcca 360
agtcatgata tgtgtggtct ggctgtacaa cgccccacct tccagttaca ggaattatga 420
catagatgag atgatttta tcacatgtaa cgagggctct gtaatggctc ttgggtttct 480
tattggctat acatgcctgc tggccgctat aygtttcttc tttgcgttta aatcacggaa 540
acttccagaa aacttcacag aggctaagtt catcactttt agtatgctca tatt        594
```

```
Leu Thr Ile Cys Ala Ala Leu Gly Val Ala Leu Thr Gly Phe Val Met
 1            5                  10                 15
Ala Val Phe Val Arg Phe Arg Asn Thr Pro Ile Val Lys Ala Thr Asn
            20                  25                 30
Arg Glu Leu Ser Tyr Val Leu Leu Phe Ser Leu Ile Cys Cys Phe Ser
            35                  40                 45
Ser Ser Leu Ile Phe Ile Gly Glu Pro Gln Asp Trp Met Cys Arg Leu
       50                  55                  60
Arg Gln Pro Ala Phe Gly Ile Ser Phe Val Leu Cys Ile Ser Cys Ile
65                  70                   75                  80
Leu Val Lys Thr Asn Arg Val Leu Leu Val Phe Glu Ala Lys Ile Pro
                85                  90                 95
Thr Ser Leu His Arg Lys Xaa Trp Gly Leu Xaa Leu Gln Phe Leu Leu
            100                 105                110
Val Phe Leu Cys Thr Phe Val Gln Val Met Ile Cys Val Val Trp Leu
            115                 120                125
Tyr Asn Ala Pro Pro Ser Ser Tyr Arg Asn Tyr Asp Ile Asp Glu Met
            130                 135                140
Ile Phe Ile Thr Cys Asn Glu Gly Ser Val Met Ala Leu Gly Phe Leu
145                 150                 155                 160
Ile Gly Tyr Thr Cys Leu Leu Ala Ala Ile Xaa Phe Phe Phe Ala Phe
                165                 170                175
Lys Ser Arg Lys Leu Pro Glu Asn Phe Thr Glu Ala Lys Phe Ile Thr
            180                 185                190
Phe Ser Met Leu Ile
            195
```

Xaa=any amino acid

FIG. 4

```
tttggccata tgtgcagtgc ttggtgttgt cttgacagct tttgtaatgg gagtatttgt  60
cagatttcgc aacaccccaa tagtgaaggc cacaaaccgg gaactatcgt acgtcctcct 120
gttctcactt atctgctgct tctccagctc tctcatcttc atcggagagc caaaggattg 180
gatgtgccgt ttgcgccaac ctgcctttgg gatcagtttt gttctgtgta tctcctgtat 240
ccttgtgaaa actaacagag tccttttggt ttttgaagct aagatcccaa caagtctcca 300
ccgtaaatgg tggggattaa acctgcagtt tcttttggtg tttctctgca catttgtcca 360
agtaatgata tgtgtggttt ggctttacaa cgcccctcct tccagttata tgatccatga 420
cattgatgag ataattttta tcacctgcaa tgagggctct gtgatggctc ttggcttttct 480
tattggctac acctgcctcc tggcagctat atgtttcttc tttgcattta aatcacgaaa 540
acttccagaa aactttacag aagccaagtt catcactttt agcatgctca tatt          594
```

| Leu | Ala | Ile | Cys | Ala | Val | Leu | Gly | Val | Val | Leu | Thr | Ala | Phe | Val | Met |
|---|---|---|---|---|---|---|---|---|---|---|---|---|---|---|---|
| 1 | | | | 5 | | | | | 10 | | | | | 15 | |
| Gly | Val | Phe | Val | Arg | Phe | Arg | Asn | Thr | Pro | Ile | Val | Lys | Ala | Thr | Asn |
| | | | 20 | | | | | 25 | | | | | 30 | | |
| Arg | Glu | Leu | Ser | Tyr | Val | Leu | Leu | Phe | Ser | Leu | Ile | Cys | Cys | Phe | Ser |
| | | | 35 | | | | 40 | | | | | 45 | | | |
| Ser | Ser | Leu | Ile | Phe | Ile | Gly | Glu | Pro | Lys | Asp | Trp | Met | Cys | Arg | Leu |
| | 50 | | | | | 55 | | | | | 60 | | | | |
| Arg | Gln | Pro | Ala | Phe | Gly | Ile | Ser | Phe | Val | Leu | Cys | Ile | Ser | Cys | Ile |
| 65 | | | | | 70 | | | | | 75 | | | | | 80 |
| Leu | Val | Lys | Thr | Asn | Arg | Val | Leu | Leu | Val | Phe | Glu | Ala | Lys | Ile | Pro |
| | | | | 85 | | | | | 90 | | | | | 95 | |
| Thr | Ser | Leu | His | Arg | Lys | Trp | Trp | Gly | Leu | Asn | Leu | Gln | Phe | Leu | Leu |
| | | | | 100 | | | | 105 | | | | | 110 | | |
| Val | Phe | Leu | Cys | Thr | Phe | Val | Gln | Val | Met | Ile | Cys | Val | Val | Trp | Leu |
| | | | 115 | | | | 120 | | | | | 125 | | | |
| Tyr | Asn | Ala | Pro | Pro | Ser | Ser | Tyr | Met | Ile | His | Asp | Ile | Asp | Glu | Ile |
| | 130 | | | | | 135 | | | | | 140 | | | | |
| Ile | Phe | Ile | Thr | Cys | Asn | Glu | Gly | Ser | Val | Met | Ala | Leu | Gly | Phe | Leu |
| 145 | | | | | 150 | | | | | 155 | | | | | 160 |
| Ile | Gly | Tyr | Thr | Cys | Leu | Leu | Ala | Ala | Ile | Cys | Phe | Phe | Phe | Ala | Phe |
| | | | | 165 | | | | | 170 | | | | | 175 | |
| Lys | Ser | Arg | Lys | Leu | Pro | Glu | Asn | Phe | Thr | Glu | Ala | Lys | Phe | Ile | Thr |
| | | | 180 | | | | | 185 | | | | | 190 | | |
| Phe | Ser | Met | Leu | Ile | | | | | | | | | | | |
| | | | | 195 | | | | | | | | | | | |

FIG. 5

```
cctgacaata ttcgcagtgc taggagtctt gctgacagcc ttcgtcctgg gggtgttcgc 60
ccgattccgt aacactccma ttgtgaaggc caccaaccgg gagctgtcct acctcctcct 120
cttctccctg gtctgctgct ctccagctc tctaatgttc atcggcgaac cccaggactg 180
gacgtgccgt ctgcgccagc cggccttcgg gatcagcttc gtcctctgca tctcctgcat 240
cctggtcaag accaaccgcg tgctgctcgt cttcgaggcc aagatcccca ccagtctcca 300
ccgcaagtgg tggggcctga acctgcagtt cctgctggtg ttcctgtgca cttcgtcca 360
ggtgatgatt tgcgtggtct ggctctacaa cgccccgccg ccagctcca agaaccacga 420
catcgatgag atcatcttca tcacctgcaa cgagggctcc atgatggccc tgggctttct 480
gatcggctac acctgtctcc tcgccgccat ttgcttcttc ttcgcgttca atcgcgcaa 540
actcccggag aacttcacag aggcgaagtt catcacgttc agcatgctga tatt 594
```

```
Leu Thr Ile Phe Ala Val Leu Gly Val Leu Leu Thr Ala Phe Val Leu
 1               5                  10                  15
Gly Val Phe Ala Arg Phe Arg Asn Thr Pro Ile Val Lys Ala Thr Asn
                20                  25                  30
Arg Glu Leu Ser Tyr Leu Leu Leu Phe Ser Leu Val Cys Cys Phe Ser
            35                  40                  45
Ser Ser Leu Met Phe Ile Gly Glu Pro Gln Asp Trp Thr Cys Arg Leu
        50                  55                  60
Arg Gln Pro Ala Phe Gly Ile Ser Phe Val Leu Cys Ile Ser Cys Ile
65                  70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
            100                 105                 110
Val Phe Leu Cys Thr Phe Val Gln Val Met Ile Cys Val Val Trp Leu
        115                 120                 125
Tyr Asn Ala Pro Pro Ala Ser Ser Lys Asn His Asp Ile Asp Glu Ile
    130                 135                 140
Ile Phe Ile Thr Cys Asn Glu Gly Ser Met Met Ala Leu Gly Phe Leu
145                 150                 155                 160
Ile Gly Tyr Thr Cys Leu Leu Ala Ala Ile Cys Phe Phe Phe Ala Phe
                165                 170                 175
Lys Ser Arg Lys Leu Pro Glu Asn Phe Thr Glu Ala Lys Phe Ile Thr
            180                 185                 190
Phe Ser Met Leu Ile
            195
```

FIG. 6

```
tttggccata tgtgcagtac tgggtgtggt catgacagcg tttgtgatgg gagtctttgt  60
cagatttcgc aacaccccaa tagtgaagac cacaaaccga gaactgtcct acgtcctcct 120
attctcactg atctgctgct tctccagctc cctcgtcttc attggagagc cacaggattg 180
gacatgtcgt ttacgtcaac ctgcctttgg tatcagcttt gttctctgta tctcctgcat 240
ccttgtgaaa acaaacagag tactttggt atttgaagct aagatcccca caagtctcca 300
tcgtaaatgg tggggattga acctgcagtt cctgctggtg tttctgtgca catttgtcca 360
agtcatgata tgtgtggtat ggctttacaa cgccctcct tccagctaca ggaatacga 420
cattgatgaa atcatttta tcacctgcaa tgagggatct gtgatggctc ttgggtttct 480
tattggccac acgtgcctcc tggcagctat atgttttttc tttgcattca aatctcggaa 540
acttccagaa aactttacag aggcaaagtt catcaccttt agcatgctaa tatt        594
```

Leu Ala Ile Cys Ala Val Leu Gly Val Val Met Thr Ala Phe Val Met
1           5                   10                  15
Gly Val Phe Val Arg Phe Arg Asn Thr Pro Ile Val Lys Thr Thr Asn
            20                  25                  30
Arg Glu Leu Ser Tyr Val Leu Leu Phe Ser Leu Ile Cys Cys Phe Ser
            35                  40                  45
Ser Ser Leu Val Phe Ile Gly Glu Pro Gln Asp Trp Thr Cys Arg Leu
    50                  55                  60
Arg Gln Pro Ala Phe Gly Ile Ser Phe Val Leu Cys Ile Ser Cys Ile
65                  70                  75                  80
Leu Val Lys Thr Asn Arg Val Leu Leu Val Phe Glu Ala Lys Ile Pro
            85                  90                  95
Thr Ser Leu His Arg Lys Trp Trp Gly Leu Asn Leu Gln Phe Leu Leu
            100                 105                 110
Val Phe Leu Cys Thr Phe Val Gln Val Met Ile Cys Val Val Trp Leu
            115                 120                 125
Tyr Asn Ala Pro Pro Ser Ser Tyr Arg Asn His Asp Ile Asp Glu Ile
    130                 135                 140
Ile Phe Ile Thr Cys Asn Glu Gly Ser Val Met Ala Leu Gly Phe Leu
145                 150                 155                 160
Ile Gly His Thr Cys Leu Leu Ala Ala Ile Cys Phe Phe Phe Ala Phe
            165                 170                 175
Lys Ser Arg Lys Leu Pro Glu Asn Phe Thr Glu Ala Lys Phe Ile Thr
            180                 185                 190
Phe Ser Met Leu Ile
            195

FIG. 7

```
cttggcatta tgctctgtgc tggggggtatt cttgacrgca ttcgtgatgg gagtgtttat  60
caaatttcgc aacacccccaa ttgttaaggc cacaaacaga gagctatcct acctcctcct 120
gttctcactc atctgctgtt tctccagttc cctcatcttc attggtgaac cccaggactg 180
gacatgccgt ctacgccagc ctgcattcgg gataagtttt gttctctgca tctcctgcat 240
cctggtaaaa actaaccgag tacttctagt gttcgaagcc aagatcccca ccagtctcca 300
tcgtaagtgg tgggggctaa acttgcagtt cctgttagtg ttcctgttca catttgtgca 360
agtgatgata tgtgtggtct ggctttacaa tgctcctccg gcgagctaca ggaaccatga 420
cattgatgag ataattttca ttacatgcaa tgagggctct atgatggcgc ttggcttcct 480
aattgggtac acatgcctgc tggcagccat atgcttcttc tttgcattta aatcacgaaa 540
actgccagag aactttactg aggctaagtt catcaccttc agcatgctca tctt        594
```

```
Leu Ala Leu Cys Ser Val Leu Gly Val Phe Leu Thr Ala Phe Val Met
 1           5              10                  15
Gly Val Phe Ile Lys Phe Arg Asn Thr Pro Ile Val Lys Ala Thr Asn
            20              25                  30
Arg Glu Leu Ser Tyr Leu Leu Leu Phe Ser Leu Ile Cys Cys Phe Ser
            35              40                  45
Ser Ser Leu Ile Phe Ile Gly Glu Pro Gln Asp Trp Thr Cys Arg Leu
    50              55                  60
Arg Gln Pro Ala Phe Gly Ile Ser Phe Val Leu Cys Ile Ser Cys Ile
65              70                  75                      80
Leu Val Lys Thr Asn Arg Val Leu Leu Val Phe Glu Ala Lys Ile Pro
            85                  90                  95
Thr Ser Leu His Arg Lys Trp Trp Gly Leu Asn Leu Gln Phe Leu Leu
            100             105                 110
Val Phe Leu Phe Thr Phe Val Gln Val Met Ile Cys Val Val Trp Leu
            115             120                 125
Tyr Asn Ala Pro Pro Ala Ser Tyr Arg Asn His Asp Ile Asp Glu Ile
    130             135                 140
Ile Phe Ile Thr Cys Asn Glu Gly Ser Met Met Ala Leu Gly Phe Leu
145             150                 155                     160
Ile Gly Tyr Thr Cys Leu Leu Ala Ala Ile Cys Phe Phe Phe Ala Phe
            165                 170                 175
Lys Ser Arg Lys Leu Pro Glu Asn Phe Thr Glu Ala Lys Phe Ile Thr
            180                 185                 190
Phe Ser Met Leu Ile
            195
```

FIG. 8

```
tttggccata tgtgcagtgc tgggtgttgt cttgacagct tttgtaatgg gagtgtttgt 60
cagatttcgc aacaccccaa tagtgaaggc cacaaaccga gaactgtctt acgtccttct 120
gttctcactt atctgttgct tctccagctc tctcatcttc atcggagagc cgaaggattg 180
gatgtgccgt ttgcgccaac ctgcctttgg gatcagtttt gttctttgta tttcctgcat 240
ccttgtgaaa acaaatagag tgcttttggt atttgaagcc aagatcccaa caagtctcca 300
ccgtaaatgg tggggattaa acctgcagtt tcttttggtg tttctctgca catttgtcca 360
agtaatgata tgtgtggtct ggctttacaa tgcccctcct tccagctata tgaaccatga 420
cattgatgag attatttta tcacctgcaa cgagggctct gtgatggctc ttgggtttct 480
tatcggctac acgtgcctcc tggcggctat atgtttcttc tttgcattta aatcacgaaa 540
acttccagaa aactttacag aggctaagtt catcactttt agcatgctca tatt        594
```

| | | | | | | | | | | | | | |
|---|---|---|---|---|---|---|---|---|---|---|---|---|---|
| Leu | Ala | Ile | Cys | Ala | Val | Leu | Gly | Val | Val | Leu | Thr | Ala | Phe | Val | Met |
| 1 | | | | 5 | | | | | 10 | | | | | 15 | |
| Gly | Val | Phe | Val | Arg | Phe | Arg | Asn | Thr | Pro | Ile | Val | Lys | Ala | Thr | Asn |
| | | | 20 | | | | | 25 | | | | | 30 | | |
| Arg | Glu | Leu | Ser | Tyr | Val | Leu | Leu | Phe | Ser | Leu | Ile | Cys | Cys | Phe | Ser |
| | | | 35 | | | | | 40 | | | | | 45 | | |
| Ser | Ser | Leu | Ile | Phe | Ile | Gly | Glu | Pro | Lys | Asp | Trp | Met | Cys | Arg | Leu |
| | | 50 | | | | | 55 | | | | | 60 | | | |
| Arg | Gln | Pro | Ala | Phe | Gly | Ile | Ser | Phe | Val | Leu | Cys | Ile | Ser | Cys | Ile |
| 65 | | | | | 70 | | | | | 75 | | | | | 80 |
| Leu | Val | Lys | Thr | Asn | Arg | Val | Leu | Leu | Val | Phe | Glu | Ala | Lys | Ile | Pro |
| | | | | 85 | | | | | 90 | | | | | 95 | |
| Thr | Ser | Leu | His | Arg | Lys | Trp | Trp | Gly | Leu | Asn | Leu | Gln | Phe | Leu | Leu |
| | | | | 100 | | | | | 105 | | | | | 110 | |
| Val | Phe | Leu | Cys | Thr | Phe | Val | Gln | Val | Met | Ile | Cys | Val | Val | Trp | Leu |
| | | | 115 | | | | | 120 | | | | | 125 | | |
| Tyr | Asn | Ala | Pro | Pro | Ser | Ser | Tyr | Met | Asn | His | Asp | Ile | Asp | Glu | Ile |
| | | 130 | | | | | 135 | | | | | 140 | | | |
| Ile | Phe | Ile | Thr | Cys | Asn | Glu | Gly | Ser | Val | Met | Ala | Leu | Gly | Phe | Leu |
| 145 | | | | | 150 | | | | | 155 | | | | | 160 |
| Ile | Gly | Tyr | Thr | Cys | Leu | Leu | Ala | Ala | Ile | Cys | Phe | Phe | Phe | Ala | Phe |
| | | | | 165 | | | | | 170 | | | | | 175 | |
| Lys | Ser | Arg | Lys | Leu | Pro | Glu | Asn | Phe | Thr | Glu | Ala | Lys | Phe | Ile | Thr |
| | | | 180 | | | | | 185 | | | | | 190 | | |
| Phe | Ser | Met | Leu | Ile | | | | | | | | | | | |
| | | | | 195 | | | | | | | | | | | |

FIG. 9

```
ccacgcgtcc gggagatggt caggagaaac atcacagatc gcatttggct agccagcgaa 60
gcgtgggcca gctcttccct tattgccaaa ccagagtatc ttgacgttgt ggcaggaact 120
attggctttg ctctgaaggc aggggggtata ccaggcttta gggagttctt acaacatgtc 180
caaccaaaga aagacagtca taatgaattt gtcagggagt tttgggaaga aaccttcaac 240
tgttatctgg aggacagccc aagactgcaa gaatgtggca gcactagttt caggcctttg 300
tgcacaggtg aggaagacat cacaagcgtc gagacccgt acctggactt cacacacctt 360
cgaatctcct ataatgtata tgttgcagtg tattccattg cacaggccct gcaggacatt 420
cttacctgca caccctggaca tggacttttt gccaacaatt cctgtgcaga tataaagaaa 480
atggaagcct ggcaggtcct gaagcagctg agacatttaa actacaccaa cagtatgggg 540
gaaaagatcc actttgatga gaatgacgac ctggctgcaa actacatgat cataaactgg 600
cacaggtcca ctgaagacgg ctctgtggtg ttcgaggagg ttggatacta ccacatgcac 660
gcgaagagag gggccaaact gctcattgac aggacaaaga ttctgtggaa tggatacagt 720
tcagaggtgc cattctcgaa ctgcagtgag gactgtgatc ctggcacaag aaagggcatc 780
atagatagta tgcccacatg ctgctttgaa tgcactgagt gctcagatgg agaatacagt 840
actcacaaag atgccagtgt ttgcaccaag tgtccaaata actcctggtc caatgggaac 900
cacacgttct gcttcctgaa ggaaattgag tttctctcct ggacagaacc tttcgggata 960
gcgttgacca tatgtgcagt gctgggtgtt gccctgacgg gcttcgtgat ggccgtcttt 1020
gtccgattcc gcaacacccc aatagtgaaa gccacgaacc gagaactgtc ctacgtcctc 1080
ctgttctctc tcatctgttg cttctccagc tccctcatct cataggaga gccgcaggat 1140
tggatgtgcc gcttacgcca accggccttt gggatcagtt tgttctctg tatctcgtgc 1200
atccttgtga aaacaaaccg agtcctcttg gtgtttaag ccaagatccc gacaagtctc 1260
catcgtaaat ggtgggggtt aaacctacag ttcctgctgg tgtttctgtg cacatttgtc 1320
caagtcatga tatgtgtggt ctggctgtac aacgccccac cttccagtta caggaattat 1380
gacatagatg agatgatttt tatcacatgt aatgaaggct ctgtaatggc tcttgggttt 1440
cttattggct atacatgcct gctggccgct atatgtttct tctttgcatt caaatcacgg 1500
aaacttccag aaaacttcac cgaggctaag ttcatcactt ttagtatgct catattcttt 1560
atcgtttgga tctctttcat ccctgcctac ttcagtactt acggaaagtt tgtttcagcg 1620
gtggaggtca ttgccatact ggcctccagc tttgggatgc tggcctgcat cttcttcaac 1680
aaggtctaca tcatcctttt caaaccgtcc cggaacacca tcgaggaggt ccggtgcagc 1740
acctcagccc acgctttcaa agtggcggca aaggctactc taaagcatag cacggcttca 1800
cggagaaagt cgggcagcac tggtggatct tctgactcca cgccgtcatc gtccatcagc 1860
ctgaagacca atggcaatga cccgacttca ggaaagccca gggtgagctt tggcagtgga 1920
acagttactt tgtccttgag cttcgaggag tcgaggagga ttctctgat gtgatagaat 1980
atgtgtggct ctgtcaagtt tcagcttcat ctgtgtcatt aataggttgt ttgttttgt 2040
tttttacacg taaacccttta catctttcct ttttcctaac attttgtccg gaatatgatc 2100
atcactccaa ctaatatact gcacctgaat cctgtgtctt gttaatgtgt agtaaatctg 2160
ctagtaatat tcacaaaacg ttttgtacaa ttaaaaaact ttatatgatc aaaaaaaaa 2220
aaaaaaag                                                         2229
```

FIG. 10A

```
Pro Arg Val Arg Glu Met Val Arg Arg Asn Ile Thr Asp Arg Ile Trp
 1            5                  10                 15
Leu Ala Ser Glu Ala Trp Ala Ser Ser Ser Leu Ile Ala Lys Pro Glu
              20                  25                 30
Tyr Leu Asp Val Val Ala Gly Thr Ile Gly Phe Ala Leu Lys Ala Gly
             35                  40                  45
Gly Ile Pro Gly Phe Arg Glu Phe Leu Gln His Val Gln Pro Lys Lys
         50                  55                  60
Asp Ser His Asn Glu Phe Val Arg Glu Phe Trp Glu Glu Thr Phe Asn
 65              70                  75                      80
Cys Tyr Leu Glu Asp Ser Pro Arg Leu Gln Glu Cys Gly Ser Thr Ser
                 85                  90                  95
Phe Arg Pro Leu Cys Thr Gly Glu Glu Asp Ile Thr Ser Val Glu Thr
            100                 105                 110
Pro Tyr Leu Asp Phe Thr His Leu Arg Ile Ser Tyr Asn Val Tyr Val
            115                 120                 125
Ala Val Tyr Ser Ile Ala Gln Ala Leu Gln Asp Ile Leu Thr Cys Thr
        130                 135                 140
Pro Gly His Gly Leu Phe Ala Asn Asn Ser Cys Ala Asp Ile Lys Lys
145                 150                 155                 160
Met Glu Ala Trp Gln Val Leu Lys Gln Leu Arg His Leu Asn Tyr Thr
                165                 170                 175
Asn Ser Met Gly Glu Lys Ile His Phe Asp Glu Asn Asp Asp Leu Ala
            180                 185                 190
Ala Asn Tyr Met Ile Ile Asn Trp His Arg Ser Thr Glu Asp Gly Ser
        195                 200                 205
Val Val Phe Glu Glu Val Gly Tyr Tyr His Met His Ala Lys Arg Gly
    210                 215                 220
Ala Lys Leu Leu Ile Asp Arg Thr Lys Ile Leu Trp Asn Gly Tyr Ser
225                 230                 235                 240
Ser Glu Val Pro Phe Ser Asn Cys Ser Glu Asp Cys Asp Pro Gly Thr
                245                 250                 255
Arg Lys Gly Ile Ile Asp Ser Met Pro Thr Cys Cys Phe Glu Cys Thr
            260                 265                 270
Glu Cys Ser Asp Gly Glu Tyr Ser Thr His Lys Asp Ala Ser Val Cys
        275                 280                 285
Thr Lys Cys Pro Asn Asn Ser Trp Ser Asn Gly Asn His Thr Phe Cys
    290                 295                 300
Phe Leu Lys Glu Ile Glu Phe Leu Ser Trp Thr Glu Pro Phe Gly Ile
305                 310                 315                 320

Ala Leu Thr Ile Cys Ala Val Leu Gly Val Ala Leu Thr Gly Phe Val
            325                 330                 335
Met Ala Val Phe Val Arg Phe Arg Asn Thr Pro Ile Val Lys Ala Thr
            340                 345                 350
Asn Arg Glu Leu Ser Tyr Val Leu Leu Phe Ser Leu Ile Cys Cys Phe
        355                 360                 365
Ser Ser Ser Leu Ile Phe Ile Gly Glu Pro Gln Asp Trp Met Cys Arg
370                 375                 380
Leu Arg Gln Pro Ala Phe Gly Ile Ser Phe Val Leu Cys Ile Ser Cys
385                 390                 395                 400
Ile Leu Val Lys Thr Asn Arg Val Leu Leu Val Phe Glu Ala Lys Ile
            405                 410                 415
Pro Thr Ser Leu His Arg Lys Trp Trp Gly Leu Asn Leu Gln Phe Leu
            420                 425                 430
Leu Val Phe Leu Cys Thr Phe Val Gln Val Met Ile Cys Val Val Trp
        435                 440                 445
```

FIG. 10B

Leu Tyr Asn Ala Pro Pro Ser Ser Tyr Arg Asn Tyr Asp Ile Asp Glu
        450             455             460
Met Ile Phe Ile Thr Cys Asn Glu Gly Ser Val Met Ala Leu Gly Phe
465             470             475             480
Leu Ile Gly Tyr Thr Cys Leu Leu Ala Ala Ile Cys Phe Phe Phe Ala
            485             490             495
Phe Lys Ser Arg Lys Leu Pro Glu Asn Phe Thr Glu Ala Lys Phe Ile
        500             505             510
Thr Phe Ser Met Leu Ile Phe Phe Ile Val Trp Ile Ser Phe Ile Pro
        515             520             525
Ala Tyr Phe Ser Thr Tyr Gly Lys Phe Val Ser Ala Val Glu Val Ile
        530             535             540
Ala Ile Leu Ala Ser Ser Phe Gly Met Leu Ala Cys Ile Phe Phe Asn
545             550             555             560
Lys Val Tyr Ile Ile Leu Phe Lys Pro Ser Arg Asn Thr Ile Glu Glu
            565             570             575
Val Arg Cys Ser Thr Ser Ala His Ala Phe Lys Val Ala Ala Lys Ala
        580             585             590
Thr Leu Lys His Ser Thr Ala Ser Arg Arg Lys Ser Gly Ser Thr Gly
        595             600             605
Gly Ser Ser Asp Ser Thr Pro Ser Ser Ser Ile Ser Leu Lys Thr Asn
    610             615             620
Gly Asn Asp Pro Thr Ser Gly Lys Pro Arg Val Ser Phe Gly Ser Gly
625             630             635             640
Thr Val Thr Leu Ser Leu Ser Phe Glu Glu Ser Arg Arg Ser Ser Leu
            645             650             655
Met

FIG. 10C

```
tgtcgtggac ggagcccttt gggatcgcgt tggccatatg tgcagcgctg ggtgttgcct  60
tgacgggctt cgtgatggcc gtctttatca gattccgcaa caccccaata gtgaaggcca 120
cgaaccgaga actgtcctat gtcctcctgt tctctctcat ctgttgcttc tccagttccc 180
tcatctttat tggagagccg caggattgga tgtgtcgttt acgccaacct gcctttggga 240
tcagttttgt tctctgtatc tcctgcatcc ttgtgaaaac taatagagta ctcttagtat 300
ttgaagccaa gatccccaca agtctccatc gtaaatggtg ggggttaaac cttcagtttt 360
tgctggtgtt tctgtgcaca tttgtccaag tcatgatctg tgttgtctgg ctgtacaatg 420
cccctccctc cagttacagg aattatgaca tagatgagat gatttttatc acatg      475
```

```
Ser Trp Thr Glu Pro Phe Gly Ile Ala Leu Ala Ile Cys Ala Ala Leu
 1               5                  10                  15
Gly Val Ala Leu Thr Gly Phe Val Met Ala Val Phe Ile Arg Phe Arg
            20                  25                  30
Asn Thr Pro Ile Val Lys Ala Thr Asn Arg Glu Leu Ser Tyr Val Leu
            35                  40                  45
Leu Phe Ser Leu Ile Cys Cys Phe Ser Ser Ser Leu Ile Phe Ile Gly
            50                  55                  60
Glu Pro Gln Asp Trp Met Cys Arg Leu Arg Gln Pro Ala Phe Gly Ile
65                  70                  75                  80
Ser Phe Val Leu Cys Ile Ser Cys Ile Leu Val Lys Thr Asn Arg Val
            85                  90                  95
Leu Leu Val Phe Glu Ala Lys Ile Pro Thr Ser Leu His Arg Lys Trp
            100                 105                 110
Trp Gly Leu Asn Leu Gln Phe Leu Leu Val Phe Leu Cys Thr Phe Val
            115                 120                 125
Gln Val Met Ile Cys Val Val Trp Leu Tyr Asn Ala Pro Pro Ser Ser
            130                 135                 140
Tyr Arg Asn Tyr Asp Ile Asp Glu Met Ile Phe Ile Thr
145                 150                 155
```

FIG. 11

|    | 10 | 20 | 30 | 40 | |
|---|---|---|---|---|---|
| C C T G A C A A T A T T C G C A G T G C T G G G A G T C T T G C T G A C G G C C | Cod NA |
| C C T G A C A A T A T T C G C A G T G C T G G G A G T C T T G C T G A C G G C C | Haddock NA |
| G C T G A C A A T A T T C G C C G T G C T C G G C G T G G T G C T C A C A G C C | Hake NA |
| G T T G A C C A T A T G T G C G G C G C T G G G T G T T G C C T T G A C A G G C | Halibut NA |
| T T T G G C C A T A T G T G C A G T G C T T G G T G T T G T C T T G A C A G C T | Mackerel NA |
| C C T G A C A A T A T T C G C A G T G C T A G G A G T C T T G C T G A C A G C C | Pollock NA |
| T T T G G C C A T A T G T G C A G T A C T G G G T G T G G T C A T G A C A G C G | Sea Bass NA |
| C T T G G C A T T A T G C T C T G T G C T G G G G G T A T T C T T G A C A G C A | Swordfish NA |
| T T T G G C C A T A T G T G C A G T G C T G G G T G T T G T C T T G A C A G C T | Tuna NA |
| G T T G A C C A T A T G T G C A G T G C T G G G T G T T G C C C T G A C G G G C | Winter Flounder NA |

|    | 50 | 60 | 70 | 80 | |
|---|---|---|---|---|---|
| T T C G T C C T A G G G G T G T T T G C C C G A T T C C G C A A C A C T C C C A | Cod NA |
| T T C G T C C T A G G G G T G T T T G C C C G A T T C C G C A A C A C T C C C A | Haddock NA |
| T T C G T C A T G G G G G T G T T T G T C C G A T T C C G C A A C A C T C C C A | Hake NA |
| T T C G T G A T G G C C G T C T T T G T C A G A T T C C G C A A C A C C C C C A | Halibut NA |
| T T T G T A A T G G G A G T A T T T G T C A G A T T T C G C A A C A C C C C A A | Mackerel NA |
| T T C G T C C T G G G G G T G T T C G C C C G A T T C C G T A A C A C T C C A A | Pollock NA |
| T T T G T G A T G G G A G T C T T T G T C A G A T T T C G C A A C A C C C C A A | Sea Bass NA |
| T T C G T G A T G G G A G T G T T T A T C A A A T T T C G C A A C A C C C C A A | Swordfish NA |
| T T T G T A A T G G G A G T G T T T G T C A G A T T T C G C A A C A C C C C A A | Tuna NA |
| T T C G T G A T G G C C G T C T T T G T C C G A T T C C G C A A C A C C C C A A | Winter Flounder NA |

|    | 90 | 100 | 110 | 120 | |
|---|---|---|---|---|---|
| T C G T G A A G G C C A C C A A C C G G G A G C T G T C C T A C C T C C T C C T | Cod NA |
| T C G T G A A G G C C A C C A A C C G G G R G C T G T C C T A C C T C C T C C T | Haddock NA |
| T C G T G A A G G C C A C C A A C A G G G A G C T G T C C T A C C T G C T C C T | Hake NA |
| T A G T G A A G G C C A C G A A C C G A G A A C T G T C C T A C G T C C T C C T | Halibut NA |
| T A G T G A A G G C C A C A A A C C G G G A A C T A T C G T A C G T C C T C C T | Mackerel NA |
| T T G T G A A G G C C A C C A A C C G G G A G C T G T C C T A C C T C C T C C T | Pollock NA |
| T A G T G A A G A C C A C A A A C C G A G A A C T G T C C T A C G T C C T C C T | Sea Bass NA |
| T T G T T A A G G C C A C A A A C A G A G A G C T A T C C T A C C T C C T C C T | Swordfish NA |
| T A G T G A A G G C C A C A A A C C G A G A A C T G T C T T A C G T C C T T C T | Tuna NA |
| T A G T G A A A G C C A C G A A C C G A G A A C T G T C C T A C G T C C T C C T | Winter Flounder NA |

|    | 130 | 140 | 150 | 160 | |
|---|---|---|---|---|---|
| C T T C T C C C T G G T C T G C T G C T T C T C C A G C T C T C T T A T G T T C | Cod NA |
| C T T C T C C C T G G T C T G C T G C T T C T C C A G C T C T C T T A T G T T C | Haddock NA |
| C T T C T C C C T C G T C T G C T G C T T C T C C A G C T C C C T C A T G T T C | Hake NA |
| G T T C T C T C T C A T C T G T T G C T T C T C C A G C T C C C T C A T C T T C | Halibut NA |
| G T T C T C A C T T A T C T G C T G C T T C T C C A G C T C T C T C A T C T T C | Mackerel NA |
| C T T C T C C C T G G T C T G C T G C T T C T C C A G C T C T C T T A T G T T C | Pollock NA |
| A T T C T C A C T G A T C T G C T G C T T C T C C A G C T C C C T C G T C T T C | Sea Bass NA |
| G T T C T C A C T C A T C T G C T G T T T C T C C A G T T C C C T C A T C T T C | Swordfish NA |
| G T T C T C A C T T A T C T G T T G C T T C T C C A G C T C T C T C A T C T T C | Tuna NA |
| G T T C T C T C T C A T C T G T T G C T T C T C C A G C T C C C T C A T C T T C | Winter Flounder NA |

FIG. 12A

```
              170             180             190             200
A T C G G T G A A C C C C A G G A C T G G A C G T G C C G C C T G C G C C A G C  Cod NA
A T C G G C G A A C C C C A G G A C T G G A C G T G C C G T C T G C G C C A G C  Haddock NA
A T C G G C G A A C C G C A G G A C T G G A C G T G C C G C C T C C G C C A G C  Hake NA
A T A G G A G A G C C G C A G G A T T G G A T G T G C C G C T T A C G C C A A C  Halibut NA
A T C G G A G A G C C A A G G A T T G G A T G T G C C G T T T G C G C C A A C    Mackerel NA
A T C G G C G A A C C C C A G G A C T G G A C G T G C C G T C T G C G C C A G C  Pollock NA
A T T G G A G A G C C A C A G G A T T G G A C A T G T C G T T T A C G T C A A C  Sea Bass NA
A T T G G T G A A C C C C A G G A C T G G A C A T G C C G T C T A C G C C A G C  Swordfish NA
A T C G G A G A G C C G A A G G A T T G G A T G T G C C G T T T G C G C C A A C  Tuna NA
A T A G G A G A G C C G C A G G A T T G G A T G T G C C G C T T A C G C C A A C  Winter Flounder NA 210             220             230             240
C G G C C T T C G G G A T C A G C T T C G T C C T C T G C A T C T C C T G C A T  Cod NA
C G G C C T T C G G G A T C A G C T T C G T C C T C T G C A T C T C C T G C A T  Haddock NA
C G G C C T T C G G C A T C A G C T T C G T C C T C T G C A T C T C C T G C A T  Hake NA
C T G C C T T T G G G A T C A G T T T T G T T C T C T G T A T C T C G T G C A T  Halibut NA
C T G C C T T T G G G A T C A G T T T T G T T C T G T G T A T C T C C T G T A T  Mackerel NA
C G G C C T T C G G G A T C A G C T T C G T C C T C T G C A T C T C C T G C A T  Pollock NA
C T G C C T T T G G T A T C A G C T T T G T T C T C T G T A T C T C C T G C A T  Sea Bass NA
C T G C A T T C G G G A T A A G T T T T G T T C T C T G C A T C T C C T G C A T  Swordfish NA
C T G C C T T T G G G A T C A G T T T T G T T C T T T G T A T T T C C T G C A T  Tuna NA
C G G C C T T T G G G A T C A G T T T T G T T C T C T G T A T C T C G T G C A T  Winter Flounder NA 250             260             270             280
C C T G G T C A A G A C C A A C C G C G T G C T G C T C G T C T T C G A G G C C  Cod NA
C C T G G T C A A G A C C A A C C G C G T G C T G C T C G T C T T C G A G G C C  Haddock NA
C T T G G T C A A G A C C A A C C G C G T G C T G C T C G T C T T C G A G G C C  Hake NA
C C T T G T C A A A A C A A A C A G A G T C C T C T T G G T G T T T G A A G C C  Halibut NA
C C T T G T G A A A A C T A A C A G A G T C C T T T T G G T T T T T G A A G C T  Mackerel NA
C C T G G T C A A G A C C A A C C G C G T G C T G C T C G T C T T C G A G G C C  Pollock NA
C C T T G T G A A A A C A A A C A G A G T A C T T T T G G T A T T T G A A G C T  Sea Bass NA
C C T G G T A A A A A C T A A C C G A G T A C T T C T A G T G T T C G A A G C C  Swordfish NA
C C T T G T G A A A A C A A A T A G A G T G C T T T T G G T A T T T G A A G C C  Tuna NA
C C T T G T G A A A A C A A A C C G A G T C C T C T T G G T G T T T G A A G C C  Winter Flounder NA 290             300             310             320
A A G A T C C C C A C C A G T C T C C A C C G C A A G T G G T G G G G C C T G A  Cod NA
A A G A T C C C C A C C A G T C T C C A C C G C A A G T G G T G G G G C C T G A  Haddock NA
A A G A T C C C C A C C A G C C T C C A C C G C A A G T G G T G G G G C T T G A  Hake NA
A A G A T C C C T A C A A G T C T C C A T C G T A A A Y G G T G G G G G T A A    Halibut NA
A A G A T C C C A A C A A G T C T C C A C C G T A A A T G G T G G G A T T A A    Mackerel NA
A A G A T C C C C A C C A G T C T C C A C C G C A A G T G G T G G G G C C T G A  Pollock NA
A A G A T C C C C A C C A G T C T C C A T C G T A A A T G G T G G G A T T G A    Sea Bass NA
A A G A T C C C C A C C A G T C T C C A T C G T A A G T G G T G G G G C T A A    Swordfish NA
A A G A T C C C A A C A A G T C T C C A C C G T A A A T G G T G G G A T T A A    Tuna NA
A A G A T C C C G A C A A G T C T C C A T C G T A A A T G G T G G G G T T A A    Winter Flounder NA
```

FIG. 12B

```
                    330              340              350              360
A C C T G C A G T T C T T G C T G G T G T T C C T G T G C A C C T T C G T C C A  Cod NA
A C C T G C A G T T C C T G C T G G T G T T C C T G T G C A C C T T C G T C C A  Haddock NA
A C C T G C A G T T C C T G C T G G T G T T C C T G T G C A C C T T T G T C C A  Hake NA
R C C T A C A G T T C C T G C T G G T G T T T C T G T G C A C A T T T G T C C A  Halibut NA
A C C T G C A G T T T C T T T G G T G T T T C T C T G C A C A T T T G T C C A    Mackerel NA
A C C T G C A G T T C C T G C T G G T G T T C C T G T G C A C C T T C G T C C A  Pollock NA
A C C T G C A G T T C C T G C T G G T G T T T C T G T G C A C A T T T G T C C A  Sea Bass NA
A C T T G C A G T T C C T G T T A G T G T T C C T G T T C A C A T T T G T G C A  Swordfish NA
A C C T G C A G T T T C T T T T G G T G T T T C T C T G C A C A T T T G T C C A  Tuna NA
A C C T A C A G T T C C T G C T G G T G T T T C T G T G C A C A T T T G T C C A  Winter Flounder NA 370              380              390              400
G G T G A T G A T T T G C G T G G T C T G G C T C T A C A A C G C C C C G C C G  Cod NA
G G T G A T G A T T T G Y G T G G T C T G G C T C T A C A A C G C C C C G C C G  Haddock NA
G G T G A T G A T C T G C G T G G T G T G G C T G T A C A A C G C C C C G C C G  Hake NA
A G T C A T G A T A T G T G T G G T C T G G C T G T A C A A C G C C C C A C C T  Halibut NA
A G T A A T G A T A T G T G T G G T T T G G C T T T A C A A C G C C C C T C C T  Mackerel NA
G G T G A T G A T T T G C G T G G T C T G G C T C T A C A A C G C C C C G C C G  Pollock NA
A G T C A T G A T A T G T G T G G T A T G G C T T T A C A A C G C C C C T C C T  Sea Bass NA
A G T G A T G A T A T G T G T G G T C T G G C T T T A C A A T G C T C C T C C G  Swordfish NA
A G T A A T G A T A T G T G T G G T C T G G C T T T A C A A T G C C C C T C C T  Tuna NA
A G T C A T G A T A T G T G T G G T C T G G C T G T A C A A C G C C C C A C C T  Winter Flounder NA 410              420              430              440
G C C A G C T C C A A G A A C C A C G A C A T C G A T G A G A T C A T C T T C A  Cod NA
G C C A G C T C C A A G A A C C A C G A C A T T G A T G A G A T C A T C T T C A  Haddock NA
G C C A G C T C C A A G A A C C A C G A C A T C G A T G A G A T C A T C T T C A  Hake NA
T C C A G T T A C A G G A A T T A T G A C A T A G A T G A G A T G A T T T T T A  Halibut NA
T C C A G T T A T A T G A T C C A T G A C A T T G A T G A G A T A A T T T T T A  Mackerel NA
G C C A G C T C C A A G A A C C A C G A C A T C G A T G A G A T C A T C T T C A  Pollock NA
T C C A G C T A C A G G A A T C A C G A C A T T G A T G A A A T C A T T T T T A  Sea Bass NA
G C G A G C T A C A G G A A C C A T G A C A T T G A T G A G A T A A T T T T C A  Swordfish NA
T C C A G C T A T A T G A A C C A T G A C A T T G A T G A G A T T A T T T T T A  Tuna NA
T C C A G T T A C A G G A A T T A T G A C A T A G A T G A G A T G A T T T T T A  Winter Flounder NA 450              460              470              480
T C A C C T G C A A C G A G G G C T C C A T G A T G G C C C T G G C T T T C T  Cod NA
T C A C C T G C A A C G A G G G C T C C A T G A T G G C C C T G G G C T T T C T  Haddock NA
T C A C C T G C A A C G A G G G C T C C A T G A T G G C C C T G G G C T T T C T  Hake NA
T C A C A T G T A A C G A G G G C T C T G T A A T G G C T C T T G G G T T T C T  Halibut NA
T C A C C T G C A A T G A G G G C T C T G T G A T G G C T C T T G G C T T T C T  Mackerel NA
T C A C C T G C A A C G A G G G C T C C A T G A T G G C C C T G G C T T T C T    Pollock NA
T C A C C T G C A A T G A G G G A T C T G T G A T G G C T C T T G G G T T T C T  Sea Bass NA
T T A C A T G C A A T G A G G G C T C T A T G A T G G C G C T T G G C T T C C T  Swordfish NA
T C A C C T G C A A C G A G G G C T C T G T G A T G G C T C T T G G G T T T C T  Tuna NA
T C A C A T G T A A T G A A G G C T C T G T A A T G G C T C T T G G G T T T C T  Winter Flounder NA
```

FIG. 12C

```
                490            500            510            520
G A T C G G C T A C A C C T G T C T C C T T G C C G C C A T T T G C T T C T T C  Cod NA
G A T C G G C T A C A C C T G T C T C C T C G C C G C C A T T T G C T T C T T C  Haddock NA
G A T C G G C T A C A C T T G C A T C C T C G C C G C T A T C T G C T T C T T C  Hake NA
T A T T G G C T A T A C A T G C C T G C T G G C C G C T A T A Y G T T T C T T C  Halibut NA
T A T T G G C T A C A C C T G C C T C C T G G C A G C T A T A T G T T T C T T C  Mackerel NA
G A T C G G C T A C A C C T G T C T C C T C G C C G C C A T T T G C T T C T T C  Pollock NA
T A T T G G C C A C A C G T G C C T C C T G G C A G C T A T A T G T T T T T T C  Sea Bass NA
A A T T G G G T A C A C A T G C C T G C T G G C A G C C A T A T G C T T C T T C  Swordfish NA
T A T C G G C T A C A C G T G C C T C C T G G C G G C T A T A T G T T T C T T C  Tuna NA
T A T T G G C T A T A C A T G C C T G C T G G C C G C T A T A T G T T T C T T C  Winter Flounder NA 530            540            550            560
T T C G C G T T C A A A T C G C G C A A A C T C C C G G A G A A C T T C A C A G  Cod NA
T T C G C G T T C A A A T C G C G C A A A C T C C C G G A G A A C T T C A C A G  Haddock NA
T T C G C G T T C A A G T C G C G C A A A C T C C C G G A G A A C T T C A C G G  Hake NA
T T T G C G T T T A A A T C A C G G A A A C T T C C A G A A A A C T T C A C A G  Halibut NA
T T T G C A T T T A A A T C A C G A A A A C T T C C A G A A A A C T T T A C A G  Mackerel NA
T T C G C G T T C A A A T C G C G C A A A C T C C C G G A G A A C T T C A C A G  Pollock NA
T T T G C A T T C A A A T C T C G G A A A C T T C C A G A A A A C T T T A C A G  Sea Bass NA
T T T G C A T T A A A A T C A C G A A A A C T G C C A G A G A A C T T T A C T G  Swordfish NA
T T T G C A T T A A A A T C A C G A A A A C T T C C A G A A A A C T T T A C A G  Tuna NA
T T T G C A T T C A A A T C A C G G A A A C T T C C A G A A A A C T T C A C C G  Winter Flounder NA 570            580            590
A G G C G A A G T T C A T C A C G T T T A G C A T G C T G A T A T T            Cod NA
A G G C G A A G T T C A T C A C G T T C A G C A T G C T G A T A T T            Haddock NA
A G G C C A A G T T C A T C A C G T T C A G C A T G C T G A T A T T            Hake NA
A G G C T A A G T T C A T C A C T T T T A G T A T G C T C A T A T T            Halibut NA
A A G C C A A G T T C A T C A C T T T T A G C A T G C T C A T A T T            Mackerel NA
A G G C G A A G T T C A T C A C G T T C A G C A T G C T G A T A T T            Pollock NA
A G G C A A A G T T C A T C A C C T T T A G C A T G C T A A T A T T            Sea Bass NA
A G G C T A A G T T C A T C A C C T T C A G C A T G C T C A T C T T            Swordfish NA
A G G C T A A G T T C A T C A C T T T T A G C A T G C T C A-T A T T            Tuna NA
A G G C T A A G T T C A T C A C T T T T A G T A T G C T C A T A T T            Winter Flounder NA
```

Decoration 'Decoration #1': Box residues that differ from the Consensus.

FIG. 12D

```
                            10                                    20
Leu Thr Ile Phe Ala Val Leu Gly Val Leu Leu Thr Ala Phe Val Leu Gly Val Phe Ala  Cod ORF
Leu Thr Ile Phe Ala Val Leu Gly Val Leu Leu Thr Ala Phe Val Leu Gly Val Phe Ala  Haddock ORF
Leu Thr Ile Phe Ala Val Leu Gly Val Val Leu Thr Ala Phe Val Met Gly Val Phe Val  Hake ORF
Leu Thr Ile Cys Ala Ala Leu Gly Val Ala Leu Thr Gly Phe Val Met Ala Val Phe Val  Halibut ORF
Leu Ala Ile Cys Ala Val Leu Gly Val Val Leu Thr Ala Phe Val Met Gly Val Phe Val  Mackerel ORF
Leu Thr Ile Phe Ala Val Leu Gly Val Leu Leu Thr Ala Phe Val Leu Gly Val Phe Ala  Pollock ORF
Leu Ala Ile Cys Ala Val Leu Gly Val Val Met Thr Ala Phe Val Met Gly Val Phe Val  Sea Bass ORF
Leu Ala Leu Cys Ser Val Leu Gly Val Phe Leu Thr Ala Phe Val Met Gly Val Phe Ile  Swordfish ORF
Leu Ala Ile Cys Ala Val Leu Gly Val Val Leu Thr Ala Phe Val Met Gly Val Phe Val  Tuna ORF
Leu Thr Ile Cys Ala Val Leu Gly Val Ala Leu Thr Gly Phe Val Met Ala Val Phe Val  Winter Flounder ORF 30                                    40
Arg Phe Arg Asn Thr Pro Ile Val Lys Ala Thr Asn Arg Glu Leu Ser Tyr Leu Leu Leu  Cod ORF
Arg Phe Arg Asn Thr Pro Ile Val Lys Ala Thr Asn Arg Glu Leu Ser Tyr Leu Leu Leu  Haddock ORF
Arg Phe Arg Asn Thr Pro Ile Val Lys Ala Thr Asn Arg Glu Leu Ser Tyr Leu Leu Leu  Hake ORF
Arg Phe Arg Asn Thr Pro Ile Val Lys Ala Thr Asn Arg Glu Leu Ser Tyr Val Leu Leu  Halibut ORF
Arg Phe Arg Asn Thr Pro Ile Val Lys Ala Thr Asn Arg Glu Leu Ser Tyr Val Leu Leu  Mackerel ORF
Arg Phe Arg Asn Thr Pro Ile Val Lys Ala Thr Asn Arg Glu Leu Ser Tyr Leu Leu Leu  Pollock ORF
Arg Phe Arg Asn Thr Pro Ile Val Lys Thr Thr Asn Arg Glu Leu Ser Tyr Val Leu Leu  Sea Bass ORF
Lys Phe Arg Asn Thr Pro Ile Val Lys Ala Thr Asn Arg Glu Leu Ser Tyr Leu Leu Leu  Swordfish ORF
Arg Phe Arg Asn Thr Pro Ile Val Lys Ala Thr Asn Arg Glu Leu Ser Tyr Val Leu Leu  Tuna ORF
Arg Phe Arg Asn Thr Pro Ile Val Lys Ala Thr Asn Arg Glu Leu Ser Tyr Val Leu Leu  Winter Flounder ORF 50                                    60
Phe Ser Leu Val Cys Cys Phe Ser Ser Ser Leu Met Phe Ile Gly Glu Pro Gln Asp Trp  Cod ORF
Phe Ser Leu Val Cys Cys Phe Ser Ser Ser Leu Met Phe Ile Gly Glu Pro Gln Asp Trp  Haddock ORF
Phe Ser Leu Val Cys Cys Phe Ser Ser Ser Leu Met Phe Ile Gly Glu Pro Gln Asp Trp  Hake ORF
Phe Ser Leu Ile Cys Cys Phe Ser Ser Ser Leu Ile Phe Ile Gly Glu Pro Gln Asp Trp  Halibut ORF
Phe Ser Leu Ile Cys Cys Phe Ser Ser Ser Leu Ile Phe Ile Gly Glu Pro Lys Asp Trp  Mackerel ORF
Phe Ser Leu Val Cys Cys Phe Ser Ser Ser Leu Met Phe Ile Gly Glu Pro Gln Asp Trp  Pollock ORF
Phe Ser Leu Ile Cys Cys Phe Ser Ser Ser Leu Val Phe Ile Gly Glu Pro Gln Asp Trp  Sea Bass ORF
Phe Ser Leu Ile Cys Cys Phe Ser Ser Ser Leu Ile Phe Ile Gly Glu Pro Gln Asp Trp  Swordfish ORF
Phe Ser Leu Ile Cys Cys Phe Ser Ser Ser Leu Ile Phe Ile Gly Glu Pro Lys Asp Trp  Tuna ORF
Phe Ser Leu Ile Cys Cys Phe Ser Ser Ser Leu Ile Phe Ile Gly Glu Pro Gln Asp Trp  Winter Flounder ORF 70                                    80
Thr Cys Arg Leu Arg Gln Pro Ala Phe Gly Ile Ser Phe Val Leu Cys Ile Ser Cys Ile  Cod ORF
Thr Cys Arg Leu Arg Gln Pro Ala Phe Gly Ile Ser Phe Val Leu Cys Ile Ser Cys Ile  Haddock ORF
Thr Cys Arg Leu Arg Gln Pro Ala Phe Gly Ile Ser Phe Val Leu Cys Ile Ser Cys Ile  Hake ORF
Met Cys Arg Leu Arg Gln Pro Ala Phe Gly Ile Ser Phe Val Leu Cys Ile Ser Cys Ile  Halibut ORF
Met Cys Arg Leu Arg Gln Pro Ala Phe Gly Ile Ser Phe Val Leu Cys Ile Ser Cys Ile  Mackerel ORF
Thr Cys Arg Leu Arg Gln Pro Ala Phe Gly Ile Ser Phe Val Leu Cys Ile Ser Cys Ile  Pollock ORF
Thr Cys Arg Leu Arg Gln Pro Ala Phe Gly Ile Ser Phe Val Leu Cys Ile Ser Cys Ile  Sea Bass ORF
Thr Cys Arg Leu Arg Gln Pro Ala Phe Gly Ile Ser Phe Val Leu Cys Ile Ser Cys Ile  Swordfish ORF
Met Cys Arg Leu Arg Gln Pro Ala Phe Gly Ile Ser Phe Val Leu Cys Ile Ser Cys Ile  Tuna ORF
Met Cys Arg Leu Arg Gln Pro Ala Phe Gly Ile Ser Phe Val Leu Cys Ile Ser Cys Ile  Winter Flounder ORF
```

FIG. 13A

|  | 90 | 100 |  |
|---|---|---|---|
| Leu Val Lys Thr Asn Arg Val Leu Leu Val | Phe Glu Ala Lys Ile Pro | Thr Ser Leu His | Cod ORF |
| Leu Val Lys Thr Asn Arg Val Leu Leu Val | Phe Glu Ala Lys Ile Pro | Thr Ser Leu His | Haddock ORF |
| Leu Val Lys Thr Asn Arg Val Leu Leu Val | Phe Glu Ala Lys Ile Pro | Thr Ser Leu His | Hake ORF |
| Leu Val Lys Thr Asn Arg Val Leu Leu Val | Phe Glu Ala Lys Ile Pro | Thr Ser Leu His | Halibut ORF |
| Leu Val Lys Thr Asn Arg Val Leu Leu Val | Phe Glu Ala Lys Ile Pro | Thr Ser Leu His | Mackerel ORF |
| Leu Val Lys Thr Asn Arg Val Leu Leu Val | Phe Glu Ala Lys Ile Pro | Thr Ser Leu His | Pollock ORF |
| Leu Val Lys Thr Asn Arg Val Leu Leu Val | Phe Glu Ala Lys Ile Pro | Thr Ser Leu His | Sea Bass ORF |
| Leu Val Lys Thr Asn Arg Val Leu Leu Val | Phe Glu Ala Lys Ile Pro | Thr Ser Leu His | Swordfish ORF |
| Leu Val Lys Thr Asn Arg Val Leu Leu Val | Phe Glu Ala Lys Ile Pro | Thr Ser Leu His | Tuna ORF |
| Leu Val Lys Thr Asn Arg Val Leu Leu Val | Phe Glu Ala Lys Ile Pro | Thr Ser Leu His | Winter Flounder ORF |

|  | 110 | 120 |  |
|---|---|---|---|
| Arg Lys Trp Trp Gly Leu Asn Leu Gln Phe | Leu Leu Val Phe Leu Cys | Thr Phe Val Gln | Cod ORF |
| Arg Lys Trp Trp Gly Leu Asn Leu Gln Phe | Leu Leu Val Phe Leu Cys | Thr Phe Val Gln | Haddock ORF |
| Arg Lys Trp Trp Gly Leu Asn Leu Gln Phe | Leu Leu Val Phe Leu Cys | Thr Phe Val Gln | Hake ORF |
| Arg Lys Arg Trp Gly Leu Asn Leu Gln Phe | Leu Leu Val Phe Leu Cys | Thr Phe Val Gln | Halibut ORF |
| Arg Lys Trp Trp Gly Leu Asn Leu Gln Phe | Leu Leu Val Phe Leu Cys | Thr Phe Val Gln | Mackerel ORF |
| Arg Lys Trp Trp Gly Leu Asn Leu Gln Phe | Leu Leu Val Phe Leu Cys | Thr Phe Val Gln | Pollock ORF |
| Arg Lys Trp Trp Gly Leu Asn Leu Gln Phe | Leu Leu Val Phe Leu Cys | Thr Phe Val Gln | Sea Bass ORF |
| Arg Lys Trp Trp Gly Leu Asn Leu Gln Phe | Leu Leu Val Phe Leu Phe | Thr Phe Val Gln | Swordfish ORF |
| Arg Lys Trp Trp Gly Leu Asn Leu Gln Phe | Leu Leu Val Phe Leu Cys | Thr Phe Val Gln | Tuna ORF |
| Arg Lys Trp Trp Gly Leu Asn Leu Gln Phe | Leu Leu Val Phe Leu Cys | Thr Phe Val Gln | Winter Flounder ORF |

|  | 130 | 140 |  |
|---|---|---|---|
| Val Met Ile Cys Val Val Trp Leu Tyr Asn | Ala Pro Pro Ala Ser Ser | Lys Asn His Asp | Cod ORF |
| Val Met Ile Cys Val Val Trp Leu Tyr Asn | Ala Pro Pro Ala Ser Ser | Lys Asn His Asp | Haddock ORF |
| Val Met Ile Cys Val Val Trp Leu Tyr Asn | Ala Pro Pro Ala Ser Ser | Lys Asn His Asp | Hake ORF |
| Val Met Ile Cys Val Val Trp Leu Tyr Asn | Ala Pro Pro Ser Ser Tyr | Arg Asn Tyr Asp | Halibut ORF |
| Val Met Ile Cys Val Val Trp Leu Tyr Asn | Ala Pro Pro Ser Ser Tyr | Met Ile His Asp | Mackerel ORF |
| Val Met Ile Cys Val Val Trp Leu Tyr Asn | Ala Pro Pro Ala Ser Ser | Lys Asn His Asp | Pollock ORF |
| Val Met Ile Cys Val Val Trp Leu Tyr Asn | Ala Pro Pro Ser Ser Tyr | Arg Asn His Asp | Sea Bass ORF |
| Val Met Ile Cys Val Val Trp Leu Tyr Asn | Ala Pro Pro Ala Ser Tyr | Arg Asn His Asp | Swordfish ORF |
| Val Met Ile Cys Val Val Trp Leu Tyr Asn | Ala Pro Pro Ser Ser Tyr | Met Asn His Asp | Tuna ORF |
| Val Met Ile Cys Val Val Trp Leu Tyr Asn | Ala Pro Pro Ser Ser Tyr | Arg Asn Tyr Asp | Winter Flounder ORF |

|  | 150 | 160 |  |
|---|---|---|---|
| Ile Asp Glu Ile Ile Phe Ile Thr Cys Asn | Glu Gly Ser Met Met Ala | Leu Gly Phe Leu | Cod ORF |
| Ile Asp Glu Ile Ile Phe Ile Thr Cys Asn | Glu Gly Ser Met Met Ala | Leu Gly Phe Leu | Haddock ORF |
| Ile Asp Glu Ile Ile Phe Ile Thr Cys Asn | Glu Gly Ser Met Met Ala | Leu Gly Phe Leu | Hake ORF |
| Ile Asp Glu Met Ile Phe Ile Thr Cys Asn | Glu Gly Ser Val Met Ala | Leu Gly Phe Leu | Halibut ORF |
| Ile Asp Glu Ile Ile Phe Ile Thr Cys Asn | Glu Gly Ser Val Met Ala | Leu Gly Phe Leu | Mackerel ORF |
| Ile Asp Glu Ile Ile Phe Ile Thr Cys Asn | Glu Gly Ser Met Met Ala | Leu Gly Phe Leu | Pollock ORF |
| Ile Asp Glu Ile Ile Phe Ile Thr Cys Asn | Glu Gly Ser Val Met Ala | Leu Gly Phe Leu | Sea Bass ORF |
| Ile Asp Glu Ile Ile Phe Ile Thr Cys Asn | Glu Gly Ser Met Met Ala | Leu Gly Phe Leu | Swordfish ORF |
| Ile Asp Glu Ile Ile Phe Ile Thr Cys Asn | Glu Gly Ser Val Met Ala | Leu Gly Phe Leu | Tuna ORF |
| Ile Asp Glu Met Ile Phe Ile Thr Cys Asn | Glu Gly Ser Val Met Ala | Leu Gly Phe Leu | Winter Flounder ORF |

FIG. 13B

|   |   |   |   |   |   |   |   | 170 |   |   |   |   |   |   |   | 180 |   |   |
|---|---|---|---|---|---|---|---|---|---|---|---|---|---|---|---|---|---|---|
| Ile | Gly | Tyr | Thr | Cys | Leu | Leu | Ala | Ala | Ile | Cys | Phe | Phe | Ala | Phe | Lys | Ser | Arg | Lys | Cod ORF |
| Ile | Gly | Tyr | Thr | Cys | Leu | Leu | Ala | Ala | Ile | Cys | Phe | Phe | Ala | Phe | Lys | Ser | Arg | Lys | Haddock ORF |
| Ile | Gly | Tyr | Thr | Cys | Ile | Leu | Ala | Ala | Ile | Cys | Phe | Phe | Ala | Phe | Lys | Ser | Arg | Lys | Hake ORF |
| Ile | Gly | Tyr | Thr | Cys | Leu | Leu | Ala | Ala | Ile | Arg | Phe | Phe | Ala | Phe | Lys | Ser | Arg | Lys | Halibut ORF |
| Ile | Gly | Tyr | Thr | Cys | Leu | Leu | Ala | Ala | Ile | Cys | Phe | Phe | Ala | Phe | Lys | Ser | Arg | Lys | Mackerel ORF |
| Ile | Gly | Tyr | Thr | Cys | Leu | Leu | Ala | Ala | Ile | Cys | Phe | Phe | Ala | Phe | Lys | Ser | Arg | Lys | Pollock ORF |
| Ile | Gly | His | Thr | Cys | Leu | Leu | Ala | Ala | Ile | Cys | Phe | Phe | Ala | Phe | Lys | Ser | Arg | Lys | Sea Bass ORF |
| Ile | Gly | Tyr | Thr | Cys | Leu | Leu | Ala | Ala | Ile | Cys | Phe | Phe | Ala | Phe | Lys | Ser | Arg | Lys | Swordfish ORF |
| Ile | Gly | Tyr | Thr | Cys | Leu | Leu | Ala | Ala | Ile | Cys | Phe | Phe | Ala | Phe | Lys | Ser | Arg | Lys | Tuna ORF |
| Ile | Gly | Tyr | Thr | Cys | Leu | Leu | Ala | Ala | Ile | Cys | Phe | Phe | Ala | Phe | Lys | Ser | Arg | Lys | Winter Flounder ORF |

|   |   |   |   |   |   |   |   | 190 |   |   |   |   |   |   |
|---|---|---|---|---|---|---|---|---|---|---|---|---|---|---|
| Leu | Pro | Glu | Asn | Phe | Thr | Glu | Ala | Lys | Phe | Ile | Thr | Phe | Ser | Met | Leu | Ile | Cod ORF |
| Leu | Pro | Glu | Asn | Phe | Thr | Glu | Ala | Lys | Phe | Ile | Thr | Phe | Ser | Met | Leu | Ile | Haddock ORF |
| Leu | Pro | Glu | Asn | Phe | Thr | Glu | Ala | Lys | Phe | Ile | Thr | Phe | Ser | Met | Leu | Ile | Hake ORF |
| Leu | Pro | Glu | Asn | Phe | Thr | Glu | Ala | Lys | Phe | Ile | Thr | Phe | Ser | Met | Leu | Ile | Halibut ORF |
| Leu | Pro | Glu | Asn | Phe | Thr | Glu | Ala | Lys | Phe | Ile | Thr | Phe | Ser | Met | Leu | Ile | Mackerel ORF |
| Leu | Pro | Glu | Asn | Phe | Thr | Glu | Ala | Lys | Phe | Ile | Thr | Phe | Ser | Met | Leu | Ile | Pollock ORF |
| Leu | Pro | Glu | Asn | Phe | Thr | Glu | Ala | Lys | Phe | Ile | Thr | Phe | Ser | Met | Leu | Ile | Sea Bass ORF |
| Leu | Pro | Glu | Asn | Phe | Thr | Glu | Ala | Lys | Phe | Ile | Thr | Phe | Ser | Met | Leu | Ile | Swordfish ORF |
| Leu | Pro | Glu | Asn | Phe | Thr | Glu | Ala | Lys | Phe | Ile | Thr | Phe | Ser | Met | Leu | Ile | Tuna ORF |
| Leu | Pro | Glu | Asn | Phe | Thr | Glu | Ala | Lys | Phe | Ile | Thr | Phe | Ser | Met | Leu | Ile | Winter Flounder ORF |

Decoration 'Decoration #1': Box residues that differ from the Consensus.

FIG. 13C

```
aattccgttg ctgtcggttc agtccaagtc tcctccagtg caaaatgaga aatggtggtc   60
gccattacag gaacatgcac tacatctgtg ttaatgaaat attgtcagtt atctgaaggt  120
tattaaaatg tttctgcaag gatggcttca cgagaaatca attctgcacg ttttcccatt  180
gtcattgtat gaataactga ccaaagggat gtaacaaaat ggaacaaagc tgaggaccac  240
gttcaccctt tcttggagca tacgatcaac cctgaaggag atggaagact gaggaggaa   300
atggggattg atcttccagg agttctgctg taaagcgatc cctcaccatt acaaagataa  360
gcagaaatcc tccaggcatc ctctgtaaac gggctggcgt agtgtggctt ggtcaaggaa  420
cagagacagg gctgcacaat ggctcagctt cactgccaac tcttattctt gggatttaca  480
ctcctacagt cgtacaatgt ctcagggtat ggtccaaacc aaagggccca gaagaaagga  540
gacatcatac tgggaggtct cttcccaata cactttggag tagccgccaa ggatcaggac  600
ttaaaatcga gaccggaggc gacaaaatgt attcggtaca attttcgagg cttccgatgg  660
ctccaggcga tgatattcgc aattgaagag attaacaaca gtatgacttt cctgcccaat  720
atcaccctgg gatatcgcat atttgacacg tgtaacaccg tgtccaaggc gctagaggca  780
acactcagct tgtggccca gaacaaaatc gactcgctga acttagatga gttctgtaac  840
tgctctgacc atatcccatc cacaatagca gtggtcgggg caacccgggtc aggaatctcc  900
acggctgtgg ccaatctatt gggattattt tacattccac aggtcagcta tgcctcctcg  960
agcaggctgc tcagcaacaa gaatgagtac aaggccttcc tgaggaccat ccccaatgat 1020
gagcaacagg ccacggccat ggccgagatc atcgagcact ccagtggaa ctgggtggga 1080
accctggcag ccgacgatga ctatggccgc ccaggcattg acaagttccg ggaggaggcc 1140
gttaagaggg acatctgtat tgacttcagt gagatgatct ctcagtacta cacccagaag 1200
cagttggagt tcatcgccga cgtcatccag aactcctcgg ccaaggtcat cgtggtcttc 1260
tccaatggcc ccgacctgga gccgctcatc caggagatag ttcggagaaa catcaccgat 1320
cggatctggc tggccagcga ggcttgggcc agctcttcgc tcattgccaa gccagagtac 1380
ttccacgtgg tcggcggcac catcggcttc gctctcaggg cggggcgtat cccagggttc 1440
aacaagttcc tgaaggaggt ccaccccagc aggtcctcgg acaatgggtt tgtcaaggag 1500
ttctgggagg agaccttcaa ctgctacttc accgagaaga ccctgacgca gctgaagaat 1560
tccaaggtgc cctcgcacgg accggcggct caaggggacg gctccaaggc ggggaactcc 1620
agacggacag ccctacgcca cccctgcact ggggaggaga acatcaccag cgtggagacc 1680
ccctacctgg attatacaca cctgaggatc tcctacaatg tatacgtggc cgtctactcc 1740
attgctcacg ccctgcaaga catccactct tgcaaacccg gcacgggcat cttttgcaaac 1800
ggatcttgtg cagatattaa aaaagttgag gcctggcagg tcctcaacca tctgctgcat 1860
ctgaagttta ccaacagcat gggtgagcag gttgactttg acgatcaagg tgacctcaag 1920
gggaactaca ccattatcaa ctggcagctc tccgcagagg atgaatcggt gttgttccat 1980
gaggtgggca actacaacgc ctacgctaag cccagtgacc gactcaacat caacgaaaag 2040
aaaatcctct ggagtggctt ctccaaagtg gttcctttct ccaactgcag tcgagactgt 2100
gtgccgggca ccaggaaggg gatcatcgag ggggagccca cctgctgctt tgaatgcatg 2160
gcatgtgcag agggagagtt cagtcgatgaa aacgatgcaa gtgcgtgtac aaagtgcccg 2220
aatgatttct ggtcgaatga gaaccacacg tcgtcgatcg ccaaggagat cgagtacctg 2280
tcgtggacgg agccttcgg gatcgctctg accatcttcg ccgtactcgg catcctgatc 2340
acctccttcg tgctggggt cttcatcaag ttcaggaaca ctcccatcgt gaaggccacc 2400
aaccgggagt tgtcctacct gctgctcttc tccctcatct gctgcttctc cagctcgctc 2460
atcttcatcg gcgagcccag ggactggacc tgtcggctcc gccaaccggc ctttggcatc 2520
agcttcgtcc tgtgcatctc ctgcatcctg gtgaagacca accgggtgct gctggtcttc 2580
gaggccaaga tccccaccag cctccaccgc aagtgggtgg gcctcaacct gcagttcctc 2640
ctggtcttcc tctgcatcct ggtgcaaatc gtcacctgca tcatctggct ctacaccgcg 2700
cctccctcca gctacaggaa ccatgagctg gaggacgagg tcatcttcat cacctgcgac 2760
gagggctcgc tcatggcgct gggcttcctc atcggctaca cctgcctcct cgccgccatc 2820
tgcttcttct tcgccttcaa gtcccgtaag ctgccggaga acttcaacga ggctaagttc 2880
atcaccttca gcatgttgat cttcttcatc gtctggatct ccttcatccc cgcctatgtc 2940
agcacctacg gcaagtttgt gtcggccgtg gaggtgattg ccatcctggc ctccagcttc 3000
gggctgctgg gctgcattta cttcaacaag tgttacatca tcctgttcaa gccgtgccgt 3060
aacaccatcg aggaggtgcg ctgcagcacg gcggcccacg ccttcaaggt ggcggcccgg 3120
gccaccctcc ggcgcagcgc cgcgtctcgc aagcgctcca gcagcctgtg cggctccacc 3180
atctcctcgc ccgcctcgtc cacctgcggg ccgggcctca ccatggagat gcagcgctgc 3240
agcacgcaga aggtcagctt cggcagcggc accgtcaccc tgtcgctcag cttcgaggag 3300
acaggccgat acgccaccct cagccgcacg gcccgcagca ggaactcggc ggatggccgc 3360
```

FIG. 14A

```
agcggcgacg acctgccatc tagacaccac gaccagggcc cgcctcagaa atgcgagccc 3420
cagcccgcca acgatgcccg atacaaggcg gcgccgacca agggcaccct agagtcgccg 3480
ggcggcagca aggagcgccc cacaactatg gaggaaacct aatccaactc ctccatcaac 3540
cccaagaaca tcctccacgg cagcaccgtc gacaactgac atcaactcct aaccggtggc 3600
tgcccaacct ctcccctctc cggcactttg cgttttgctg aagattgcag catctgcagt 3660
tcctttatc cctgattttc tgacttggat atttactagt gtgcgatgga atatcacaac 3720
ataatgagtt gcacaattag gtgagcagag ttgtgtcaaa gtatctgaac tatctgaagt 3780
atctgaacta ctttattctc tcgaattgta ttacaaacat ttgaagtatt tttagtgaca 3840
ttatgttcta acattgtcaa gataatttgt tacaacatat aaggtaccac ctgaagcagt 3900
gactgagatt gccactgtga tgacagaact gttttataac atttatcatt gaaacctgga 3960
ttgcaacagg aatataatga ctgtaacaaa aaaattgttg attatcttaa aaatgcaaat 4020
tgtaatcaga tgtgtaaaat tggtaattac ttctgtacat taaatgcata tttcttgata 4080
aaaaaaaaaa aaaaaaaaaa aaaaaaaaaa aaaaaagcgg cccgacagca acgg       4134
```

GROWING MARINE FISH IN FRESHWATER

BACKGROUND OF THE INVENTION

Growing marine fish has been generally limited to costal regions or seawater tanks. However, many freshwater aquifers exist, for example, in the Midwest as potential environments for the raising of marine fish. Until now, attempts to grow marine fish in freshwater have been unsuccessful.

Growing marine fish in freshwater would provide an opportunity for non-costal areas to raise marine fish. The ability to grow marine fish in freshwater can provide fresh fish and economic growth to these areas.

Hence, a need exists to determine whether it is possible to adapt a marine fish to freshwater, and if so, understand the biological mechanisms that allow a marine fish to do so. In particular, a need exists to grow marine fish in freshwater.

SUMMARY OF THE INVENTION

The present invention relates to methods of growing marine fish in freshwater by increasing or maintaining expression of a receptor, referred to as the Polyvalent Cation Sensing Receptor (PVCR). The expression and/or sensitivity of the PVCR is increased or maintained by subjecting the marine fish to at least one modulator of the PVCR. The marine fish are subjected to the modulator when it is added to the freshwater environment, and optionally, to the feed. The invention encompasses adding at least one PVCR modulator to the freshwater, and adding feed for fish consumption to the freshwater. The feed contains sodium chloride (NaCl) and, optionally, at least one PVCR modulator in amounts to contribute to a significant increased level of the PVCR modulator in the serum of the marine fish.

In one embodiment of the invention, marine fish (e.g., Cod, Haddock, Hake, Halibut, Mackerel, Pollock, Sea Bass, Swordfish, Tuna, Winter Flounder and Summer Flounder) are transferred to freshwater to which at least one PVCR modulator (e.g., a PVCR agonist), such as calcium and magnesium has been added. A specially developed or modified feed is added to the freshwater for fish consumption. The feed has between about 1% and about 10% NaCl by weight (e.g. between about 10,000 mg/kg and 100,000 mg/kg). The amount of calcium added to the freshwater is an amount sufficient to bring the concentration up to between about 2.0 mM and about 10.0 mM, and the amount of magnesium added is an amount sufficient to bring the concentration up to between about 0.5 mM and about 10.0 mM. The feed can optionally include a PVCR modulator, such as an amino acid. A particular amino acid that can be added is tryptophan in an amount between about 1 gm/kg and about 10 gm/kg. The present invention also includes, optionally, exposing the marine fish to a photoperiod. Preferably, the photoperiod is continuous (e.g., for a continuous period of between about 12 hours and about 24 hours in a 24 hour period).

In another embodiment, the invention relates to methods of growing marine fish in freshwater by assessing the freshwater to determine the level of at least one PVCR modulator. Based on the level determined, the method includes adding enough PVCR modulator, if any, to the freshwater in an amount sufficient to increase or maintain expression and/or sensitivity of at least one PVCR. The methods include transferring the marine fish to the freshwater, and adding feed for fish consumption to the modified freshwater, as described herein.

The present invention also relates to an aquatic mixture for providing an environment for transfer of marine fish to freshwater, comprising at least one PVCR modulator. Similarly, the present invention includes kits for growing marine fish in freshwater. The kits include the aquatic mixture described herein, and an aquatic food composition containing a concentration of NaCl between about 10,000 mg/kg and about 100,000 mg/kg.

Surprisingly, it has been discovered that increased or maintained expression and/or altering the sensitivity of the PVCR allows these marine fish to live and thrive in freshwater. Until the discovery of the present invention, the aquaculture industry was unable to transfer the marine fish to freshwater without subjecting the fish to stress, death and/or disease. Unlike this practice, carrying out the steps of the invention increases or maintains the expression and/or alters the sensitivity of the PVCR and allows for transfer of the marine fish to freshwater with minimal or no stress, death and/or disease, and unexpectedly, the fish grow. In fact, marine fish that grow in freshwater have a higher fat content, and a milder, less "fishy" taste.

BRIEF DESCRIPTION OF THE DRAWINGS

FIG. 1 is a diagram illustrating the partial nucleotide (SEQ ID NO:1) and amino acid (SEQ ID NO:2) sequences of the PVCR of Cod.

FIG. 2 is a diagram illustrating the partial nucleotide (SEQ ID NO:3) and amino acid (SEQ ID NO:4) sequences of the PVCR of Haddock.

FIG. 3 is a diagram illustrating the partial nucleotide (SEQ ID NO:5) and amino acid (SEQ ID NO:6) sequences of the PVCR of Hake.

FIG. 4 is a diagram illustrating the partial nucleotide (SEQ ID NO:7) and amino acid (SEQ ID NO:8) sequences of the PVCR of Halibut.

FIG. 5 is a diagram illustrating the partial nucleotide (SEQ ID NO:9) and amino acid (SEQ ID NO:10) sequences of the PVCR of Mackerel.

FIG. 6 is a diagram illustrating the partial nucleotide (SEQ ID NO:11) and amino acid (SEQ ID NO:12) sequences of the PVCR of Pollack.

FIG. 7 is a diagram illustrating the partial nucleotide (SEQ ID NO:13) and amino acid (SEQ ID NO:14) sequences of the PVCR of Sea Bass.

FIG. 8 is a diagram illustrating the partial nucleotide (SEQ ID NO:15) and amino acid (SEQ ID NO:16) sequences of the PVCR of Swordfish.

FIG. 9 is a diagram illustrating the partial nucleotide (SEQ ID NO:17) and amino acid (SEQ ID NO:18) sequences of the PVCR of Tuna.

FIGS. 10A–C are diagrams illustrating the partial nucleotide (SEQ ID NO:19) and amino acid (SEQ ID NO:20) sequences of the PVCR of Winter Flounder.

FIG. 11 is a diagram illustrating the partial nucleotide (SEQ ID NO:21) and amino acid (SEQ ID NO:22) sequences of PVCR of Summer Flounder.

FIGS. 12A–D are diagrams illustrating the alignment of the nucleic acids sequences for Cod (SEQ ID NO:1), Haddock (SEQ ID NO:3), Hake (SEQ ID NO:5), Halibut (SEQ ID NO:7), Mackerel (SEQ ID NO:9), Pollock (SEQ ID NO:11), Sea Bass (SEQ ID NO:13), Swordfish (SEQ ID NO:15), Tuna (SEQ ID NO:17), Winter Flounder (SEQ ID NO:19).

FIGS. 13A–C are diagrams illustrating the alignment of the amino acids sequences for Cod (SEQ ID NO:2), Haddock (SEQ ID NO:4), Hake (SEQ ID NO:6), Halibut (SEQ ID NO:8), Mackerel (SEQ ID NO:10), Pollock (SEQ ID NO:12), Sea Bass (SEQ ID NO:14), Swordfish (SEQ ID NO:16), Tuna (SEQ ID NO:18), Winter Flounder (SEQ ID NO:20).

FIGS. 14A–B are diagrams illustrating the nucleic acid sequence of SKCaR (SEQ ID NO.:23).

DETAILED DESCRIPTION OF THE INVENTION

Figure 15:
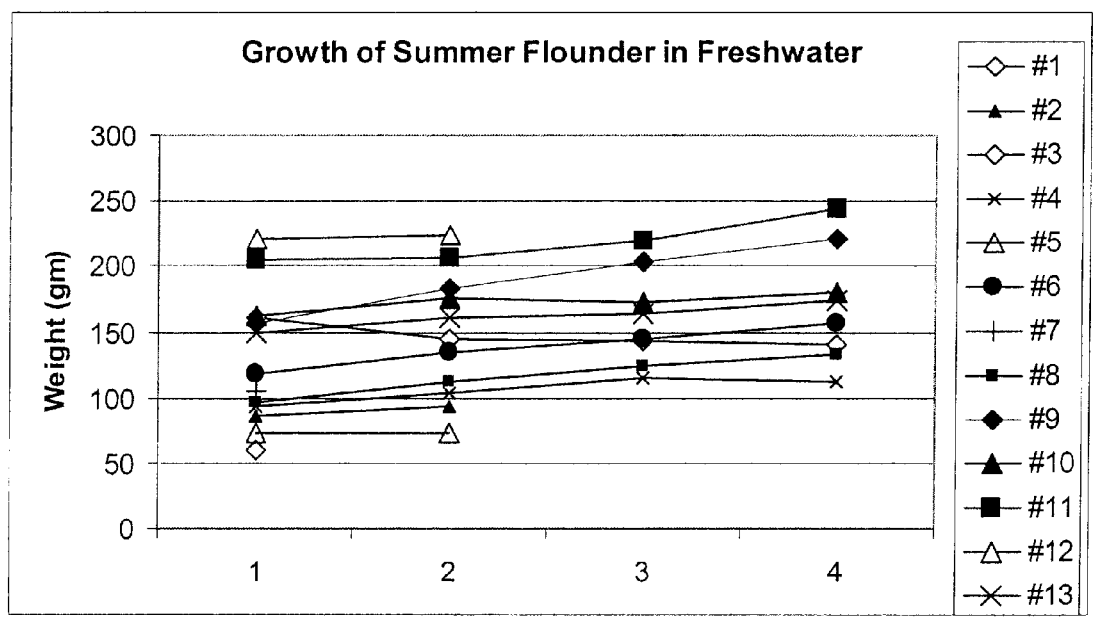
FIG. 15 is a graphical representation illustrating the growth of summer flounder in freshwater that underwent APS Process I and grown in freshwater for a total of 51 days. Samples of body characteristics of flounders were obtained at (1) prior to placement in freshwater; (2) 20 days after placement in freshwater; (3) 30 days after placement in freshwater; and (4) 51 days after placement in freshwater. APS Process I is defined in Example 2.

The present invention relates to methods for growing or raising marine fish in freshwater. The methods involve increasing or maintaining expression and/or altering the sensitivity of a Polyvalent Cation Sensing Receptor (PVCR) (e.g., at least one PVCR). The invention relates to increasing or maintaining expression of the PVCR that affects the fish's ability to adapt to freshwater.

In particular, the methods of the present invention include adding at least one PVCR modulator to the freshwater, and adding a specially made or modified feed to the freshwater for consumption by the fish. The feed contains a sufficient amount of sodium chloride (NaCl) (e.g., between about 1% and about 10% by weight, or about 10,000 mg/kg to about 100,000 mg/kg) to significantly increase levels of the PVCR modulator in the serum. This amount of NaCl in the feed causes or induces the marine fish to drink more freshwater. Since the freshwater contains a PVCR modulator and the fish ingest increased amounts of it, the serum level of the PVCR modulator significantly increases in the fish, and causes increased or maintained PVCR expression and/or altered PVCR sensitivity.

The methods of the present invention pertain to adapting marine fish to freshwater. Marine fish are fish that live, at least for most of their adult lives, in seawater. Marine fish include, for example, Cod, Haddock, Hake, Halibut, Mackerel, Pollock, Sea Bass, Swordfish, Tuna, Winter Flounder, and Summer Flounder. The term "marine fish" is understood by one of skill in the art.

The term, "freshwater," means water that comes from, for example, a stream, river, ponds, public water supply, or from other non-marine sources having, for example, the following ionic composition: less than about 2 mM of magnesium, calcium and NaCl. The marine fish are adapted to freshwater having a PVCR modulator. The phrases "modified freshwater," "freshwater as modified by the addition of a PVCR" and "PVCR modulator environment" refer to freshwater to which at least one PVCR modulator has been added, as described herein.

The PVCR modulator is added to the freshwater in sufficient amounts to increase or maintain expression or alter the sensitivity of the PVCR. A PVCR has been isolated from various tissue of several types of marine fish using molecular biology techniques. DNA was isolated from muscle samples from various species of marine fish including Cod, Haddock, Hake, Halibut, Mackerel, Pollock, Sea Bass, Swordfish, Tuna, Winter Flounder and Summer Flounder. The DNA was amplified using polymerase Chain Reaction (PCR) methodology. The amplified DNA was purified and subcloned into vectors, and their sequences were determined, as described in Example 4.

The PVCR, which is located in various tissues (e.g., gill, skin, intestine, kidney, urinary bladder, brain or muscle) of the marine fish, senses alterations in PVCR modulators including various ions (e.g., divalent cations), for example, in the surrounding water, in their serum or in the luminal contents of tubules inside the body, such as kidney, urinary bladder, or intestine. Its ability to sense these modulators increases expression of the PVCR, thereby allowing the fish to better adapt to freshwater. Increased or maintained expression of the PVCR can occur, for example, in one or all tissues.

A "PVCR modulator" is defined herein to mean a compound which increases expression of the PVCR, increases the sensitivity or responsiveness of the PVCR, or maintains an already increased PVCR expression level. Such compounds include, but are not limited to, PVCR agonists (e.g., inorganic polycations, organic polycations and amino acids), Type II calcimimetics, and compounds that indirectly alter PVCR expression (e.g., 1,25 dihydroxyvitamin D in concentrations of about 3,000–10,000 International Units /kg feed), cytokines such as Interleukin Beta, and Macrophage Chemotactic Peptide-1 (MCP-1)). Examples of Type II calcimimetics, which increase expression or sensitivity of the PVCR, are, for example, NPS-R-467 and NPS-R-568 from NPS Pharmaceutical Inc., (Salt Lake, Utah, U.S. Pat. Nos. 5,962,314; 5,763,569; 5,858,684; 5,981,599; 6,001,884) which can be administered in concentrations of between about 0.1 $\mu$M and about 100 $\mu$M feed or water. See Nemeth, E. F. et al., *PNAS* 95: 4040–4045 (1998). Examples of inorganic polycations are divalent cations including calcium at a concentration between about 2.0 and about 10.0 mM and magnesium at a concentration between about 0.5 and about 10.0 mM; and trivalent cations including, but not limited to, gadolinium (Gd3+) at a concentration between about 1 and about 500 $\mu$M. Organic polycations including, but not limited to, aminoglycosides such as neomycin or gentamicin in concentrations of between about 1 and about 8 gm/kg feed as well as organic polycations including polyamines (e.g., polyarginine, polylysine, polyhistidine, polyomithine, spermine, cadaverine, putricine, copolymers of poly arginine/histidine, poly lysine/arginine in concentrations of between about 10 $\mu$M and 10 mM feed). See Brown, E. M. et al., *Endocrinology* 128: 3047–3054 (1991); Quinn, S. J. et al., *Am. J. Physiol.* 273: C1315–1323 (1997). Additionally, PVCR agonists include amino acids such as L-Tryptophan L-Tyrosine, L-Phenylalanine, L-Alanine, L-Serine, L-Arginine, L-Histidine, L-Leucine, L-Isoleucine, and L-Cystine at concentrations of between about 1 and about 10 gm/kg feed. See Conigrave, A. D., et al, *PNAS* 97: 4814–4819 (2000). The molar concentrations refer to free or ionized concentrations of the PVCR modulator in the freshwater, and does not include amounts of bound PVCR modulator (e.g., PVCR modulator bound to negatively charged particles including glass, proteins, or plastic surfaces).

The PVCR modulator can be administered to the fish in a number of ways. The invention encompasses administration of the PVCR in any way that is sufficient to increase or maintain the expression and/or alter the sensitivity of the PVCR. In one embodiment, the PVCR modulator is simply added to the freshwater in various concentrations, as described herein. PVCR modulators that are added to the water increase or maintain expression and/or alter the sensitivity of the PVCR on the skin and gills of the fish, and can be ingested by the fish, in particular, when fish are fed feed having between about 1% and about 10% NaCl (e.g., in concentrations between about 1 and about 10 gm/100 gm feed). In addition to adding NaCl to the feed, the PVCR modulator can also be added to the feed. Amounts and types of PVCR modulators added to the feed are also described herein. Other embodiments include subjecting the fish to the PVCR modulator by "dipping" the fish in the modulator, e.g., organic polycations. The organic polycations can be formulated in such a way as to allow the polycations to adhere to the skin and gills of the fish, in sufficient amounts to increase or maintain expression of the PVCR.

The invention also embodies assessing the amounts of existing PVCR modulator in the freshwater environment. PVCR modulators are assessed using methods known in the art. After assessment, the PVCR modulator is added to the water to bring the concentration up to an amount sufficient to increase or maintain expression and/or sensitivity of at least one PVCR, or sufficient to bring the concentrations of the PVCR modulator within the stated ranges. For example, an aquifer assessed at having only 0.2 mM of calcium needs additional calcium to bring the concentration up to between about 0.5 mM and between about 10.0 mM.

In one preferred embodiment, the present invention is practiced by adding a combination of two PVCR agonists to the freshwater. In particular, calcium and magnesium are added to the freshwater to bring the concentrations of each to between about 0.3 mM and about 10.0 mM of calcium, and between about 0.5 mM and about 10.0 mM of magnesium. In addition to adding calcium and magnesium to the water, these ranges of ion concentrations can be achieved by providing a brackish water (e.g., diluted seawater) environment for the fish.

Calcium and magnesium can come from a variety of sources, that when added to the water, the calcium and/or magnesium levels increase or maintain expression of the PVCR, and/or are within the stated ranges. Sources of calcium and magnesium can be a mixture of a variety of compounds, or each can come from a substantially uniform or pure compound. Sources of calcium include, for example, $Ca(CO_3)_2$, $CaCl_2$, and $CaSO_4$ and sources of magnesium include, for example, $MgCl_2$, $MgSO_4$, $MgBr_2$, and $MgCO_3$.

In one embodiment, the invention includes intermittent (e.g., interrupted) as well as continuous (e.g., non-interrupted) exposure to freshwater having at least one PVCR modulator, while on the NaCl diet. Intermittent exposure to the PVCR can occur so long as the PVCR expression and/or altered sensitivity remains increased or maintained. Continuous maintenance in or exposure to freshwater having at least one PVCR modulator is shown in Example 2.

The marine fish are transferred from seawater. The term, "seawater," means water that comes from the sea, or water which has been formulated to simulate the chemical and mineral composition of water from the sea. The major elemental composition of the prepared seawater preferably falls substantially within the range of the major elemental composition of the natural seawater (e.g., having the following ionic composition: greater than 30 mM of magnesium, greater than about 6 mM of calcium, and greater than about 300 mM NaCl). Methods of preparing artificial seawater are known in the art and are described in, for instance, U.S. Pat. No. 5,351,651.

In an embodiment, the marine fish are also preconditioned by subjecting the fish to a gradual or step-wise decrease in salinity for a period of time prior to transfer to freshwater, while being fed a NaCl diet. Salinity refers to the ionic concentrations (e.g., calcium, magnesium and sodium) in water. The fish are maintained in a decreasing salinity environment for a sufficient period of time to increase or maintain expression and/or sensitivity of at least one PVCR. Factors that can influence the length of time to maintain the fish in a decreased salinity prior to transfer to freshwater include, but are not limited to, size of the fish, level of PVCR expression or sensitivity, if any, prior to addition of the PVCR modulator to the freshwater, the fish's ability to excrete the PVCR modulator and ions, the fish's surface to volume ratio, etc. Therefore, the length of time the fish is maintained can range between about 5 days and about 60 days, and preferably, between about 10 days and 25 days. The ionic concentrations of seawater are decreased by between about 10% and about 90%, and preferably, between about 25% and about 50%. Combinations of decreasing salinity and various lengths of exposure to the salinity are encompassed by the invention. In one experiment, the fish were adapted to 50% salinity of seawater for 10 days, and then for 25% salinity of seawater for 15 days, prior to transfer to freshwater. See Example 2. After maintenance in water having decreasing salinity, as compared to seawater, the marine fish are then placed into freshwater having a PVCR modulator, as described herein. The fish can remain and grow in freshwater, modified by the addition of PVCR modulators, indefinitely, so long as there is increased or maintained expression and/or sensitivity of the PVCR (e.g., maintained in modified freshwater and fed an NaCl diet).

The invention further includes adding feed to the freshwater. The frequency and amounts of feed that fish are fed, are taught in the art. Generally, the fish are fed 1–3 times a day, totaling about 0.25–0.5% body weight/day. The feed has enough NaCl to contribute to a significant increased or maintained level of the PVCR modulator in the serum of the marine fish. More specifically, NaCl has at least two effects. The first occurs when sufficient amounts of NaCl are present in the feed. The presence of NaCl in the feed causes the marine fish to drink more water from the surrounding environment. Second, NaCl is a direct negative PVCR modulator, and works to decreases PVCR sensitivity. Despite NaCl's effect in decreasing sensitivity, it surprisingly increases PVCR expression when fish are fed a NaCl diet and the surrounding freshwater environment has at least one PVCR modulator it in. The increase in the ingestion of freshwater having PVCR modulators causes an overall increase of the serum levels of PVCR modulators.

The present invention also relates to an aquatic food composition. The feed contains between about 1%–10% of NaCl by weight, or between about 10,000 mg of NaCl/kg of feed and about 100,000 mg of NaCl/kg of feed (e.g., 12,000 mg/kg). The feed is referred to herein as a "NaCl diet." The NaCl can be combined with other sodium salts to confer the desired effect of increasing or maintaining PVCR expression, altering PVCR sensitivity and/or inducing the fish to drink more. Hence, as used herein, the term NaCl, includes a substantially pure compound, and mixtures of NaCl with other sources of sodium. The feed can further include a PVCR modulator, and in particular a PVCR agonist such as an amino acid. In one embodiment, the feed has between about 1% and about 10% NaCl by weight and an amino acid such as tryptophan in an amount between about 1 and about 10 gm/kg. This embodiment is referred to herein as "APS Process II," which is further defined in Example 2.

The feed can be made in a number of ways, so long as the proper concentration of NaCl is present. The feed can be made, for example, by reformulating the feed, or by allowing the feed to absorb a solution having the NaCl and optionally, adding a PVCR modulator. A top dressing can be added for palatability. Example 3 describes in detail one way to make the feed.

Another embodiment of the present invention includes feeding marine fish feed having between 1% and 10% NaCl by weight when the fish are maintained in a freshwater environment having between about 0.3 and about 10.0 mM of calcium, and between about 0.5 mM and about 10.0 mM of magnesium. When this embodiment of the present invention is carried out, the levels of calcium, magnesium and/or sodium in the serum of the marine fish is increased, as compared to PVCR expression and/or sensitivity seen in freshwater fish.

In another embodiment, the fish, while in water having decrease salinity, as compared to seawater, or while in the freshwater having the PVCR modulator, are also exposed to a photoperiod. A photoperiod refers to exposing the fish to light (e.g., sunlight, incandescent light or fluorescent light). Preferably, the photoperiod is substantially continuous, or occurs long enough to increase growth. The photoperiod can occur for at least about 12 hours within a 24 hour interval, or for longer periods such as about 14, 16, 18, 20, 22 or preferably, about 24 hours.

Upon transfer to freshwater, marine fish that are not subjected to the steps of the present invention experience osmotic stress, reduced or no food consumption, and eventually death. In comparison, when performing the methods of the present invention, the marine fish consume feed and exhibit growth. The osmotic stress results from differences in the osmotic pressure between the surrounding environment and body compartments of the fish. This disturbs the homeostatic equilibrium of the fish and results in decreased growth, reproductive failure and reduced resistance to disease. The fish that have undergone the steps of the present invention do not experience a significant amount of osmotic stress, and begin feeding on or soon after transfer to seawater. As a result, the fish are able to grow. In the experiments, the fish adapted by the present invention surprisingly grow almost as well as marine fish maintained in seawater (e.g., 53% increased growth in fish subjected to the present invention for 37 days, as compared to 60% increased growth of fish maintained in seawater for 37 days). See Example 2 and FIGS. 15 and 16.

Since the methods of the present invention increase or maintain the expression and/or sensitivity of the PVCR in marine fish, they survive better when transferred to freshwater. The reduced osmotic stress results in reduced mortality. In one case, certain populations of marine fish that did not undergo the methods of the present invention and transferred to freshwater exhibit a 100% mortality rate. This occurs because the fish experience osmotic shock when transferred to freshwater which has a very different ionic composition than seawater. However, when marine fish undergo the methods of the present invention, the fish exhibit a survival rate that is significantly greater than the rate for marine fish that are transferred directly to freshwater and not subjected to the steps of the present invention (e.g.,between about 60% about 100%).

The methods of the present invention also decrease the incidence of disease among the marine fish transferred to freshwater. Because the fish treated with the methods of the present invention experience less stress upon transfer to freshwater, their immune functions are stronger, and they are less susceptible to parasitic, viral, bacterial and fungal diseases. Fish not treated with the methods described herein are more susceptible to such diseases, and can serve as reservoirs of disease, capable of infecting healthy fish.

Methods Assessment of the PVCR

The present invention includes methods of detecting the level of the PVCR to determine whether fish are ready for transfer from seawater to freshwater. Methods that measure PVCR levels include several suitable assays. Suitable assays encompass immunological methods, such as FACS analysis, radioimmunoassay, flow cytometry, enzyme-linked immunosorbent assays (ELISA) and chemiluminescence assays. Any method known now or developed later can be used for measuring PVCR expression.

Antibodies reactive with the PVCR or portions thereof can be used. In a preferred embodiment, the antibodies specifically bind with the PVCR or a portion thereof. The antibodies can be polyclonal or monoclonal, and the term antibody is intended to encompass polyclonal and monoclonal antibodies, and functional fragments thereof. The terms polyclonal and monoclonal refer to the degree of homogeneity of an antibody preparation, and are not intended to be limited to particular methods of production.

In several of the preferred embodiments, immunological techniques detect PVCR levels by means of an anti-PVCR antibody (i.e., one or more antibodies). The term "anti-PVCR" antibody includes monoclonal and/or polyclonal antibodies, and mixtures thereof.

Anti-PVCR antibodies can be raised against appropriate immunogens, such as isolated and/or recombinant PVCR or portion thereof (including synthetic molecules, such as synthetic peptides). In one embodiment, antibodies are raised against an isolated and/or recombinant PVCR or portion thereof (e.g., a peptide) or against a host cell which expresses recombinant PVCR. In addition, cells expressing recombinant PVCR, such as transfected cells, can be used as immunogens or in a screen for antibody which binds receptor.

Any suitable technique can prepare the immunizing antigen and produce polyclonal or monoclonal antibodies. The art contains a variety of these methods (see e.g., Kohler et al., Nature, 256: 495–497 (1975) and Eur. J. Inmmunol. 6: 511–519 (1976); Milstein et al., Nature 266: 550–552 (1977); Koprowski et al., U.S. Pat. No. 4,172,124; Harlow, E. and D. Lane, 1988, Antibodies: A Laboratory Manual, (Cold Spring Harbor Laboratory: Cold Spring Harbor, N.Y.); Current Protocols In Molecular Biology, Vol. 2 (Supplement 27, Summer '94), Ausubel, F. M. et al., Eds., (John Wiley & Sons: New York, N.Y.), Chapter 11, (1991)). Generally, fusing a suitable immortal or myeloma cell line, such as SP2/0, with antibody producing cells can produce a hybridoma. Animals immunized with the antigen of interest provide the antibody producing cell, preferably cells from the spleen or lymph nodes. Selective culture conditions isolate antibody producing hybridoma cells while limiting dilution techniques produce them. Researchers can use suitable assays such as ELISA to select antibody producing cells with the desired specificity.

Other suitable methods can produce or isolate antibodies of the requisite specificity. Examples of other methods include selecting recombinant antibody from a library or relying upon immunization of transgenic animals such as mice.

According to the method, an assay can determine the level of PVCR in a biological sample. In determining the amounts of PVCR, an assay includes combining the sample to be tested with an antibody having specificity for the PVCR, under conditions suitable for formation of a complex between antibody and the PVCR, and detecting or measuring (directly or indirectly) the formation of a complex. The sample can be obtained directly or indirectly, and can be prepared by a method suitable for the particular sample and assay format selected.

In particular, tissue samples, e.g., gill tissue samples, can be taken from fish after they are anaesthetized with MS-222. The tissue samples are fixed by immersion in 2% paraformaldehyde in appropriate Ringers solution corresponding to the osmolality of the fish, washed in Ringers, then frozen in an embedding compound, e.g., O.C.T.™ (Miles, Inc., Elkahart, Ind., USA) using methylbutane cooled with liquid nitrogen. After cutting 8–10 μ tissue sections with a cryostat, individual sections are subjected to various staining protocols. For example, sections are: 1) blocked with goat serum or serum obtained from the same species of fish, 2) incubated with rabbit anti-CaR or anti-PVCR antiserum, and 3) washed and incubated with peroxidase-conjugated affinity-purified goat antirabbit antiserum. The locations of the bound peroxidase-conjugated goat antirabbit antiserum are then visualized by development of a rose-colored aminoethylcarbazole reaction product. Individual sections are mounted, viewed and photographed by standard light microscopy techniques. The anti-CaR antiserum used to detect fish PVCR protein is raised in rabbits using a 23-mer peptide corresponding to amino acids numbers 214–236 localized in the extracellular domain of the RaKCaR protein. The sequence of the 23-mer peptide is: ADDDYGRPGIEK-FREEAEERDIC (SEQ ID NO.:24) A small peptide with the sequence DDYGRPGIEKFREEAEERDICI (SEQ ID NO.:25) or ARSRNSADGRSGDDLPC (SEQ ID NO.:26) can also be used to make antisera containing antibodies to PVCRs. Such antibodies can be monoclonal, polyclonal or chimeric.

Suitable labels can be detected directly, such as radioactive, fluorescent or chemiluminescent labels. They can also be indirectly detected using labels such as enzyme labels and other antigenic or specific binding partners like biotin. Examples of such labels include fluorescent labels such as fluorescein, rhodamine, chemiluminescent labels such as luciferase, radioisotope labels such as 32P, 125I, 131I, enzyme labels such as horseradish peroxidase, and alkaline phosphatase, β-galactosidase, biotin, avidin, spin labels and the like. The detection of antibodies in a complex can also be done immunologically with a second antibody which is then detected (e.g., by means of a label). Conventional methods or other suitable methods can directly or indirectly label an antibody.

In performing the method, the levels of the PVCR are distinct from the control. Increased levels or the presence of PVCR expression, as compared to a control, indicate that the fish or the population of fish from which a statistically significant amount of fish were tested, are ready for transfer to freshwater. A control refers to a level of PVCR, if any, from a fish that is not subjected to the steps of the present invention, e.g., not subjected to freshwater having a PVCR modulator and/or not fed a NaCl diet.

The PVCRs can also be assayed by Northern blot analysis of mRNA from tissue samples. Northern blot analysis from various shark tissues has revealed that the highest degree of PVCRs expression is in gill tissue, followed by the kidney and the rectal gland. There appear to be at least three distinct mRNA species of about 7 kb, 4.2 kb and 2.6 kb.

The PVCRs can also be assayed by hybridization, e.g., by hybridizing one of the PVCR sequences provided herein (e.g., SEQ ID NO:1,3,5,7,9,11,13,15, 17, 19, 21 or 23) or an oligonucleotide derived from one of the sequences, to a DNA-containing tissue sample from a fish. Such a hybridization sequence can have a detectable label, e.g., radioactive, fluorescent, etc., attached, to allow to detection of hybridization product. Methods for hybridization are well known, and such methods are provided in U.S. Pat. No. 5,837,490, by Jacobs et al., the entire teachings of which are herein incorporated by reference in their entirety. The design of the oligonucleotide probe should preferably follow these parameters: (a) it should be designed to an area of the sequence which has the fewest ambiguous bases ("N's"), if any, and (b) it should be designed to have a $T_m$ of approx. 80° C. (assuming 2° C. for each A or T and 4 degrees for each G or C).

Stringency conditions for hybridization refers to conditions of temperature and buffer composition which permit hybridization of a first nucleic acid sequence to a second nucleic acid sequence, wherein the conditions determine the degree of identity between those sequences which hybridize to each other. Therefore, "high stringency conditions" are those conditions wherein only nucleic acid sequences which are very similar to each other will hybridize. The sequences can be less similar to each other if they hybridize under moderate stringency conditions. Still less similarity is needed for two sequences to hybridize under low stringency conditions. By varying the hybridization conditions from a stringency level at which no hybridization occurs, to a level at which hybridization is first observed, conditions can be determined at which a given sequence will hybridize to those sequences that are most similar to it. The precise conditions determining the stringency of a particular hybridization include not only the ionic strength, temperature, and the concentration of destabilizing agents such as formamide, but also on factors such as the length of the nucleic acid sequences, their base composition, the percent of mismatched base pairs between the two sequences, and the frequency of occurrence of subsets of the sequences (e.g. small stretches of repeats) within other non-identical sequences. Washing is the step in which conditions are set so as to determine a minimum level of similarity between the sequences hybridizing with each other. Generally, from the lowest temperature at which only homologous hybridization occurs, a 1% mismatch between two sequences results in a 1° C. decrease in the melting temperature ($T_m$) for any chosen SSC concentration. Generally, a doubling of the concentration of SSC results in an increase in the $T_m$ of about 17° C. Using these guidelines, the washing temperature can be determined empirically, depending on the level of mismatch sought. Hybridization and wash conditions are explained in *Current Protocols in Molecular Biology* (Ausubel, F. M. et al., eds., John Wiley & Sons, Inc., 1995, with supplemental updates) on pages 2.10.1 to 2.10.16, and 6.3.1 to 6.3.6.

High stringency conditions can employ hybridization at either (1) 1×SSC (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 65° C., (2) 1×SSC, 50% formamide, 1% SDS, 0.1–2 mg/ml denatured calf thymus DNA at 42° C., (3) 1% bovine serum albumen (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 65° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 42° C., (5) 5×SSC, 5×Denhardt's solution, 1% SDS, 100 µg/ml denatured calf thymus DNA at 65° C., or (6) 5×SSC, 5×Denhardt's solution, 50% formamide, 1% SDS, 100 µg/ml denatured calf thymus DNA at 42° C., with high stringency washes of either (1) 0.3–0.1×SSC, 0.1% SDS at 65° C., or (2) 1 mM Na$_2$EDTA, 40 mM NaHPO$_4$ (pH 7.2), 1% SDS at 65° C. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in °C.=(2×the number of A and T bases)+(4×the number of G and C bases). For hybrids believed to be about 18 to about 49 base pairs in length, the $T_m$ in °C.=(81.5° C.+16.6(log$_{10}$M)+0.41(%G+C)−0.61 (% formamide)−500/L), where "M" is the molarity of monovalent cations (e.g., Na$^+$), and "L" is the length of the hybrid in base pairs.

Moderate stringency conditions can employ hybridization at either (1) 4×SSC, (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 65° C., (2) 4×SSC, 50% formamide, 1% SDS, 0.1–2 mg/ml denatured calf thymus DNA at 42° C., (3) 1% bovine serum albumen (fraction V), 1 mM Na2.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 65° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 42° C., (5) 5×SSC, 5×Denhardt's solution, 1% SDS, 100 µg/ml denatured calf thymus DNA at 65° C., or (6) 5×SSC, 5×Denhardt's solution, 50% formamide, 1% SDS, 100 µg/ml denatured calf thymus DNA at 42° C., with moderate stringency washes of 1×SSC, 0.1% SDS at 65° C. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in °C.=(2×the number of A and T bases)+(4×the number of G and C bases). For hybrids believed to be about 18 to about 49 base pairs in length, the $T_m$ in °C.=(81.5° C.+16.6(log$_{10}$M)+0.41(% G+C)−0.61 (% formamide)−500/L), where "M" is the molarity of monovalent cations (e.g. Na$^+$), and "L" is the length of the hybrid in base pairs.

Low stringency conditions can employ hybridization at either (1) 4×SSC, (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 50° C., (2) 6×SSC, 50% formamide, 1% SDS, 0.1–2 mg/ml denatured calf thymus DNA at 40° C., (3) 1% bovine serum albumen (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 g/ml denatured calf thymus DNA at 50° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 40° C., (5) 5×SSC, 5×Denhardt's solution, 1% SDS, 100 µg/ml denatured calf thymus DNA at 50° C., or (6) 5×SSC, 5×Denhardt's solution, 50% formamide, 1% SDS, 100 µg/ml denatured calf thymus DNA at 40° C., with low stringency washes of either 2×SSC, 0.1% SDS at 50° C., or (2) 0.5% bovine serum albumin (fraction V), 1 mM Na$_2$EDTA, 40 mM NaHPO$_4$ (pH 7.2), 5% SDS. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in °C.=(2×the number of A and T bases)+(4×the number of G and C bases). For hybrids believed to be about 18 to about 49 base pairs in length, the $T_m$ in °C.=(81.5° C.+16.6(log$_{10}$M)+0.41(%G+C)−0.61 (% formamide)−500/L), where "M" is the molarity of monovalent cations (e.g., Na$^+$), and "L" is the length of the hybrid in base pairs.

Hence, the present invention includes kits for the detection of the PVCR or the quantification of the PVCR having either antibodies specific for the PVCR or a portion thereof, or a nucleic acid sequence that can hybridize to the nucleic acid of the PVCR.

Alterations in the expression or sensitivity of PVCRs could also be accomplished by introduction of a suitable transgene. Suitable transgenes would include either the PVCR gene itself or modifier genes that would directly or indirectly influence PVCR gene expression. Methods for successful introduction, selection and expression of the transgene in fish oocytes, embryos and adults are described in Chen, T T et al., Transgenic Fish, *Trends in Biotechnology* 8:209–215 (1990).

The present invention is further and more specifically illustrated by the following Examples, which are not intended to be limiting in any way.

EXEMPLIFICATION

Example 1

Polyvalent Cation-sensing Receptors (PVCRs) Serve as Salinity Sensors in Fish

Polyvalent cation-sensing receptors (PVCRs) serve as salinity sensors in fish. These receptors are localized to the apical membranes of various cells within the fish's body (e.g., in the gills, intestine, kidney) that are known to be responsible for osmoregulation. A full-length cation receptor (CaR) from the dogfish shark has been expressed in human HEK cells. This receptor was shown to respond to alterations in ionic compositions of NaCl, Ca2+ and Mg2+ in extracellular fluid bathing the HEK cells. The ionic concentrations responded to encompassed the range which includes the transition from freshwater to seawater. Expression of PVCR mRNA is also increased in fish after their transfer from freshwater to seawater, and is modulated by PVCR agonists.

Figure 16:
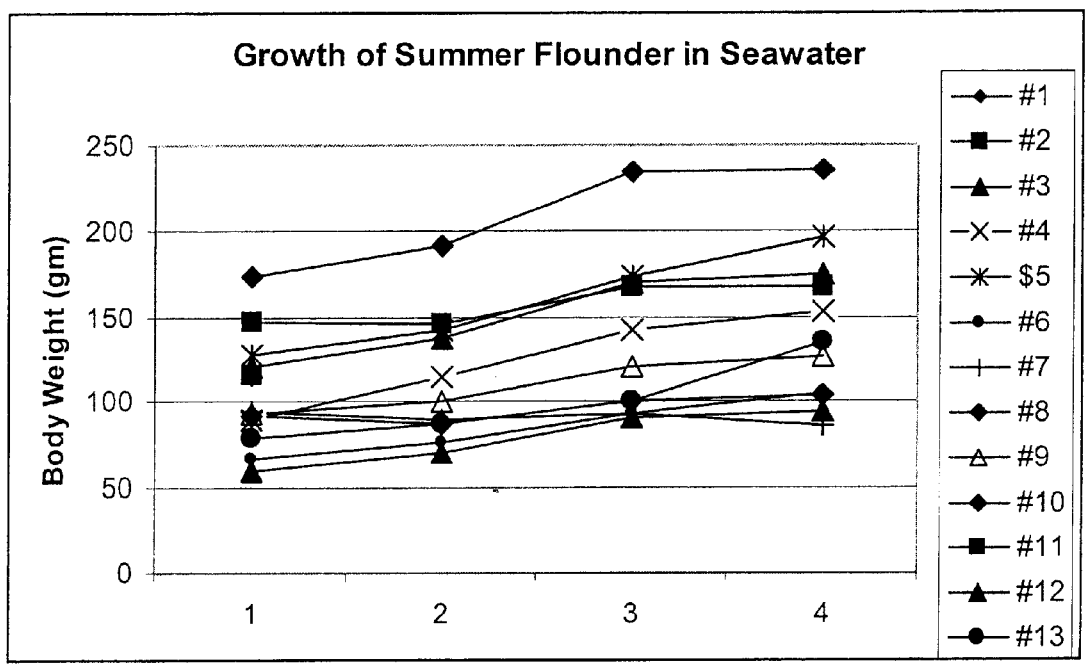
FIG. 16 is a graphical representation illustrating the growth of summer flounder in seawater for a total of 51 days. Samples of body characteristics of flounders were obtained at (1) prior to placement in seawater; (2) 20 days after placement in seawater; (3) 30 days after placement in seawater; and (4) 51 days after placement in seawater.

Using nucleic acid amplification with degenerate primers, partial genomic clones of PVCRs have also been isolated from other fish species, including Cod (FIG. 1), Haddock (FIG. 2), Hake (FIG. 3), Halibut (FIG. 4), Mackerel (FIG. 5), Pollock (FIG. 6), Sea Bass (FIG. 7), Swordfish (FIG. 8), Tuna (FIG. 9), Winter Flounder (FIGS. 10A–10C) and Summer Flounder (FIG. 11). The degenerate oligonucleotide primers used for isolating these clones, except for Winter Flounder, were 5'-TGT CKT GGA CGG AGC CCT TYG GRA TCG C-3' (SEQ ID NO:27) and 5'-GGC KGG RAT GAA RGA KAT CCA RAC RAT GAA G-3' (SEQ ID NO:28), where K is T or G, Y is C or T, and R is A or G. The degenerate oligos were generated by standard methodologies (Preston, G. M., 1993, "Polymerase chain reaction with degenerate oligonucleotide primers to clone gene family members," in: Methods in Mol. Biol., vol. 58, ed. A. Harwood, Humana Press, pp. 303–312). Genomic bands from these three species were amplified, purified by agarose gel electrophoresis, ligated into an appropriate plasmid vector (Novagen's pT7 Blue or Promega's pGEM-T) and transformed into an appropriate bacterial host strain (Novagens' Nova Blue Competent Cells or Promega's JM 109 competent cells). The plasmids and inserts were purified from the host cells, and sequenced. FIG. 15 shows the deduced amino acid sequences and alignment for the PVCRs from Cod, Haddock, Hake, Halibut, Mackerel, Pollock, Sea Bass, Swordfish, Tuna and Winter Flounder.

A winter flounder lambda ZAP cDNA library was manufactured using standard commercially available reagents with cDNA synthesized from poly A+RNA isolated from winter flounder urinary bladder tissue as described and published in Siner et al. *Am. J. Physiol.* 270:C372–C381, 1996. The winter flounder urinary bladder cDNA library was plated and resulting phage plaques screened using a 32P-labeled shark kidney calcium receptor cDNA probe under intermediate stringency conditions (0.5×SSC, 0.1% SDS, 50° C.). Individual positive plaques were identified by autoradiography, isolated and rescued using phagemid infections to transfer cDNA to KS Bluescript vector. The nucleotide (nt) sequence, FIG. 10A, (SEQ ID NO:19) of the winter flounder PVCR clone was obtained using commercially available automated sequencing service that performs nucleotide sequencing using the dideoxy chain termination technique. The deduced amino acid sequence (SEQ ID NO:20) is shown in FIGS. 10B and 10C. The winter flounder PVCR nucleotide sequence was compared to others aquatic PVCR using commercially available nucleotide and protein database services including GENBANK and SWISS PIR.

Example 2
Growth of Marine Fish in Freshwater Using the Methods of the Present Invention
Methods The following examples refer to APS Process I and APS Process II throughout. APS stands for "AquaBio Products Sciences®, L.L.C." APS Process I is also referred to herein as "SUPERSMOLT™ I Process" or "Process I." An "APS Process I" fish or smolt refers to a fish or smolt that has undergone the steps of APS Process I. An APS Process I smolt is also referred to as a "SUPERSMOLT™ I" or a "Process I" smolt. Likewise, APS Process II is also referred to herein as "SUPERSMOLT™ II Process" or "Process II." An "APS Process II" fish or smolt refers to a fish or smolt that has undergone the steps of APS Process II. An APS Process II smolt is also referred to as a "SUPERSMOLT™ II" or a "Process II" smolt.

APS Process I

Marine fish are exposed to or maintained freshwater containing 0.3–10.0 mM Calcium and 0.5–10.0 mM Magnesium ions. This water is prepared by addition of calcium carbonate and/or chloride and magnesium chloride to the freshwater. Fish are fed with feed pellets containing 1–7% (weight/weight) NaCl. See Example 3 for further details regarding the feed. Fish are exposed to or maintained in this regimen of water mixture and feed for a total of 30–45 days, using standard hatchery care techniques. Water temperatures vary between 10–16° C. Fish are exposed to a constant photoperiod for the duration of APS Process I. A fluorescent light is used for the photoperiod.

APS Process II

Marine fish are exposed to or maintained in freshwater containing 0.3–10.0 mM Calcium and 0.5–10.0 mM Magnesium ions. This water is prepared by addition of calcium carbonate and/or chloride and magnesium chloride to the freshwater. Fish are fed with feed pellets containing 1–7% (weight/weight) NaCl and either 2 gm or 4 gm of L-Tryptophan per kg of feed. See Example 3 for further details regarding the feed. Fish are exposed to or maintained in this regimen of water mixture and feed for a total of 30–45 days using standard hatchery care techniques. Water temperatures vary between 10–16° C. Fish are exposed to a constant photoperiod for the duration of APS Process II. A fluorescent light is used for the photoperiod.

Summer Flounders of various weights that were all derived from a single homogenous stock of farm raised animals (Great Bay AquaFarms Portsmouth, N.H.) were transported and placed in artificial seawater (Crystal Sea) within the APS laboratory. These were divided into two groups (n=13) and one maintain in seawater (Seawater Control) for a total of 81 days and fed a standard flounder diet (Corey Feeds, New Brunswick, Canada). The other (Freshwater) was adapted to APS Process I conditions over 30 days consisting of 5 mM Ca2+, 8 mM Mg2+ concentrations in the water and a 1.2% NaCl supplemented diet of 70% standard flounder feed (Corey Feeds, New Brunswick, Canada) and 30% ground squid. These flounder were then maintained in APS Process I conditions for a total of 51 days and their growth compared to that exhibited by matched paired summer flounder maintain in seawater.

Flounders were adapted to the APS Process I by the following 30 day schedule:

1. Maintenance in seawater for 5 days.
2. Reduce water salinity to 50% seawater for 10 days.
3. Reduce water salinity to 25% seawater for 15 days.
4. Place fish in APS Process I water (5 mM Ca2+, 8 mM Mg2+ concentrations in the freshwater, pH 7.6–8.0)

Fish were individually tagged using colored elastomer tags their change in weight was determined at specific time points through the 51 day experimental interval Results and Discussion A marine fish, Summer Flounder, can be adapted and grown under APS Process I conditions for a prolonged interval (51 days) with growth rates similar to that exhibited by matched control Summer Flounder in seawater.

Tables I and II display data obtained from identical groups of summer flounder maintain under either seawater (seawater control) or APS Process I freshwater conditions. Water quality and temperatures (16.3 vs 17.9° C. average) were comparable. Flounders were successfully adapted to APS Process I conditions without significant mortalities and their overall appearance did not differ significantly from those matched controls that were maintained in seawater.

TABLE I

Growth of Summer Flounder in Freshwater.
APS Freshwater

| Flounder # | | Weight Start | Weight 20 days | Weight 37 days | Weight 51 days | Total Weight Gained |
|---|---|---|---|---|---|---|
| 116 | 1 | 161 | 145 | 144 | 140 | −21 |
| 118 | 2 | 87 | 94 | | | |
| 123 | 3 | 60 | | | | |
| 142 | 4 | 94 | 104 | 115 | 112 | 18 |
| 146 | 5 | 73 | 73 | | | |
| 221 | 6 | 118 | 135 | 145 | 156 | 38 |
| 223 | 7 | 105 | | | | |
| 225 | 8 | 96 | 112 | 124 | 133 | 37 |
| 226 | 9 | 156 | 183 | 203 | 221 | 65 |
| 227 | 10 | 162 | 176 | 172 | 180 | 18 |
| 233 | 11 | 205 | 207 | 220 | 244 | 39 |
| 234 | 12 | 221 | 224 | | | |
| 235 | 13 | 150 | 161 | 164 | 174 | 24 |

TABLE I-continued

Growth of Summer Flounder in Freshwater.
APS Freshwater

| | | | | | |
|---|---|---|---|---|---|
| | 129.8462 | 146.7273 | 160.875 | 170 | 27.2 |
| | 50.15 | 48.34065 | 36.65452 | 44.75648 | |
| p TEST Value | 0.017186 | | 0.013243 | 0.0085 | |
| Amount Fed (gm) | 342 | | 315 | 291 | 948 |
| Average Water Temp (degrees C.) | 17.9 | | 19.4 | 16.4 | 17.9 |
| FCR | | | | | 3.96 |
| SGR | | | | | 0.53% bwt day. |

TABLE II

Growth of Summer Flounder in Seawater.
APS Seawater Total days 51

| Fish # | Start | 20 days | 37 days | 51 days | Total Weight Gained |
|---|---|---|---|---|---|
| 117 | 114 | | | | |
| 118 | 147 | 146 | 168 | 168 | 21 |
| 120 | 60 | 70 | 91 | 94 | 34 |
| 122 | 90 | 115 | 142 | 153 | 63 |
| 126 | 128 | 142 | 174 | 196 | 68 |
| 127 | 67 | 76 | 93 | 105 | 38 |
| 130 | 95 | 90 | 93 | 86 | −9 |
| 131 | 92 | 87 | 101 | 104 | 12 |
| 132 | 93 | 101 | 121 | 127 | 34 |
| 134 | 174 | 191 | 235 | 236 | 62 |
| 139 | 116 | | | | |
| 140 | 121 | 138 | 170 | 175 | 54 |
| 145 | 79 | 87 | 100 | 135 | 56 |
| Average | 105.8462 | 113 | 135.2727 | 143.5455 | 39.36364 |
| S. Dev. | 31.997 | 37.26392 | 46.82327 | 47.05181 | |
| T test | | 0.308845 | 0.041076 | 0.014804 | |
| Amount Fed (gm) | | 301 | 324 | 254 | 879 |
| FCR | | | | | 1.99 |
| SGR | | | | | 0.6% bw/day |

Overall mortalities of fish during the 51 day test interval was lower in seawater (2/13 or 15.4%) as compared to flounders maintained under APS Process I conditions (5/13 or 8.5%). The average weight gained by all flounders maintain under APS Process I conditions (27.2 gm) was less as compared to overall weight gain of the seawater control group (38.4 gm). Significant weight gains were observed in both groups after intervals of 20 days for APS Process I fish and 37 days for flounder maintained in seawater. Thus, the average specific growth rates amongst the surviving flounders in APS Process I (0.53% body weight per day) were comparable to those maintained in seawater (0.6% body weight per day).

In contrast, 100% of marine fish (Cod, Haddock, Hake, Halibut, Mackerel, Pollock, Sea Bass, Swordfish, Tuna, Winter Flounder and Summer Flounder) die within 72 hours of freshwater transfer.

Comparison of the food conversion ratio (FCR) between flounders maintained in APS Process I vs seawater shows that flounders maintained under APS Process I conditions displayed a significantly greater FCR (3.96), as compared to their matched seawater controls (1.99).

FIG. 1 shows the individual weight gain performances of tagged flounders maintained under APS Process I or seawater conditions. It is notable that there are wide variations in individual growth rates such that some flounders (#9 and #11) exhibited steady and significant growth under APS Process I conditions while others showed poor weight gains (eg #10) or even lost weight (#1). Similar performance characteristics were observed for flounder in seawater although the variation in individual performances were less pronounced as compared to flounders maintained in APS Process I.

Taken together, these data demonstrate that summer flounder can be successfully maintained under freshwater conditions using APS Process I for a prolonged interval (51 days) of time. Under normal conditions, summer flounder growth and survival are normally restricted to approximately 25% seawater whereupon the flounders die if the salinity is further reduced. These data form the basis of culture of summer flounder in freshwater environments distant from the marine environment itself where prices for flounder fillets would more than offset the poorer performance (increased mortalities and poorer FCR and weight gains) as compared to seawater controls.

Transferring marine fish to freshwater using APS Process II is expected to provide even better growth rates, than seen with APS Process I. Salmon and Trout that underwent APS Process II exhibited significant increases in growth rates, as illustrated in co-pending applications, Ser. Nos. 09/687,477, 09/687,476 and 09/687,372, all entitled, "Methods for Raising Pre-Adult Anadromous Fish," all filed on Oct. 12, 2000.

Example 3

The Feed p Two general methods were used to prepare feed for consumption by fish as part of APS Process I and II. These two processes involve either reformulation of feed or addition of a concentration solution for absorption by the feed followed by a top dressing for palatability. This disclosure describes the methodology to prepare feed using each of these 2 methods.

Methods
Feed Manufacture for Salmon Experiments

To reformulate feed, the ingredients are as follows: Base Diet was made using the following ingredients and procedure: 30% Squid (liquefied in blender), 70%Corey Aquafeeds flounder diet (powderized in blender). Ingredients were blended into a semi moist "dough" ball. Other ingredients including NaCl or PVCR active compounds were blended into the base diet by weight according to what the experiment called for.

Moore Clark standard freshwater salmonid diet (sizes 1.2,1.5.2.0, 2.5, and 3.5 mm) can also be used. A top dressing was applied to the pellets such that top dressing is composed of 4% of the weight of the Base Diet. Top dressing is composed of 50% krill hydrolysate (Specialty Marine Products Ltd.) and 50% Menhaden fish oil. The top dressing is added for palatability and sealing of added ingredients Other ingredients can include NaCl, MgC12, CaC12 or L-Tryptophan that are added by weight to the base diet by weight.

Preparation of Feed Containing 7% (weight/weight) NaCl For the APS Process I

Solid sodium chloride or NaCl apportioned at a ratio of 7% of the weight of the Moore Clark standard freshwater salmonid diet weight was added to a volume of tap water approximately 3–4 times the weight of NaCl. The mixture was heated to 60–70° C. with mixing via use of a magnetic stirring bar to dissolve salt. The NaCl solution was then poured into a hand held sprayer and applied to the Moore Clark standard freshwater salmonid diet that is tumbling inside of a 1.5 cubic meter motorized cement mixer. After absorption of the NaCl rich solution, the wetted Moore Clark standard freshwater salmonid diet is spread out thinly on window screening and placed in an enclosed rack system equipped with a fan and 1500 watt heater to expedite drying process. After drying for approximately 6 hr, the dried NaCl-rich pellets are returned to the cement mixer and a top dressing is applied. The feed is stored at room temperature until use.

Preparation of Feed Containing 7% (weight/weight) NaCl+ PVCR Agonist (Tryptophan) For the APS Process II Solid sodium chloride or NaCl apportioned at a ratio of 7% of the weight of the Moore Clark standard freshwater salmonid diet weight was added to a volume of tap water approximately 3–4 times the weight of NaCl. The mixture was heated to 60–70° C. with mixing via use of a magnetic stirring bar to dissolve salt. USP Grade L-Tryptophan was added to the water at either 2 grams or 4 grams for every kg of Moore Clark standard freshwater salmonid diet depending on formulation need. Dilute hydrochloric acid was added to the water with mixing until the tryptophan was dissolved and the pH of solution was approximately 4.0. The NaCl+ Tryptophan solution was then poured into a hand held sprayer and was then applied to the Moore Clark standard freshwater salmonid diet tumbling inside a cement mixer. After absorption of the NaCl+Tryptophan solution, the wetted Moore Clark standard freshwater salmonid diet is then spread out thinly on window screening and placed in an enclosed rack system equipped with a fan and 1500-watt heater to expedite drying process. After drying for approximately 6 hr, the dried NaCl/Tryptophan-rich pellets are then returned to the cement mixer and a top dressing is applied. The feed is stored at room temperature until use.

Example 4

DNA and Putative Protein Sequences from Partial Genomic Clones of Polyvalent Cation Receptor Protein Amplified by PCR from the DNA of Several Species of Marine Fish These data provide the partial genomic sequences derived from the PVCR gene in 13 species of marine fish. Each of these nucleotide sequences is unique and thus could be used as a unique probe to isolate the full-length cDNA from each species. Moreover, this DNA fragment could form the basis for a specific assay kit(s) for detection of PVCR expression in various tissues of these fish.

The PVCR has been isolated in several species including Cod, Haddock, Hake, Halibut, Mackerel, Pollock, Sea Bass, Swordfish, Tuna, Winter Flounder and Summer Flounder. Sequences of mammalian CaRs together with the nucleotide sequence of SKCaR (FIGS. 14A and 14B) were used to design degenerate oligonucleotide primers to highly conserved regions in the extracellular domain of polyvalent cation receptor proteins using standard methodologies (See GM Preston, Polymerase chain reaction with degenerate oligonucleotide primers to clone gene family members, Methods in Mol. Biol. Vol. 58 Edited by A. Harwood, Humana Press, pages 303–312, 1993). Using these primers, cDNA or genomic DNA from various fish species representing important commercial products are amplified using standard PCR methodology. Amplified bands are then purified by agarose gel electrophoresis and ligated into appropriate plasmid vector that is transformed into a bacterial strain. After growth in liquid media, vectors and inserts are purified using standard techniques, analyzed by restriction enzyme analysis and sequenced where appropriate. Using this methodology, nucleotide sequences were amplified.

To generate this sequence data, DNA was isolated from muscle samples of each of the species indicated using standard published techniques. DNA was then amplified using polymerase chain reaction (PCR) methodology including 2 degenerate PCR primers (DSK-F3 (5'-TGT CKT GGA CGG AGC CCT TYG GRA TCG C-3'; SEQ ID NO.: 29) and DSK-R4; (5'-GGC KGG RAT GAA RGA KAT CCA RAC RAT GAA G-3' SEQ ID NO:30). Amplified DNAs were then purified by agarose gel electrophoresis, subcloned into plasmid vectors, amplified, purified and sequenced using standard methods.

FIGS. 12A–D show an aligned genomic DNA sequences of 480 nucleotides for 12 marine fish species, each of which codes for an identical region of the PVCR protein. Note that each nucleotide sequence derived from each specific species is unique. However, alterations in the DNA sequences of these genes often occur at common specific nucleotides within each sequence of 480 nucleotides.

FIGS. 13A–C show aligned corresponding predicted protein sequences derived from genomic nucleotide sequences displayed in FIGS. 12A–D. Note that few alterations in the amino acid sequence of this portion of the PVCR occur as a consequence of alterations in the nucleotide sequence as shown in FIGS. 12A–D. All of these changes (e.g., Ala to Val; Arg to Lys; and Cys to Tyr) are known as "conservative" substitutions of amino acids in that they preserve some combination of the relative size, charge and hydrophobicity of the peptide sequence.

All cited references, patents, and patent applications are incorporated herein by reference in their entirety. Also, companion patent application Ser. No. 09/687,477, entitled "Methods for Raising Pre-Adult Anadromous Fish," filed on Oct. 12, 2000; patent application Ser. No. 09/687,476, entitled "Methods for Raising Pre-Adult Anadromous Fish," filed on Oct. 12, 2000; patent application Ser. No. 09/687,372, entitled "Methods for Raising Pre-Adult Anadromous Fish," filed on Oct. 12, 2000; Provisional Patent Application No. 60/240,392, entitled "Polyvalent Cation Sensing Receptor Proteins in Aquatic Species," filed on Oct. 12, 2000; Provisional Patent Application No. 60/240,003, entitled "Polyvalent Cation Sensing Receptor Proteins in Aquatic Species," filed on Oct. 12, 2000, are all hereby incorporated by reference in their entirety. Additionally, application Ser. No. 09/162,021, filed on Sep. 28, 1998, International PCT application No. PCT/US97/05031, filed on Mar. 27, 1997, and application Ser. No. 08/622,738 filed Mar. 27, 1996, all entitled, "Polycation Sensing Receptor in Aquatic Species and Methods of Use Thereof" are all hereby incorporated by reference in their entirety.

While this invention has been particularly shown and described with references to preferred embodiments thereof, it will be understood by those skilled in the art that various changes can be made therein without departing from the scope of the invention encompassed by the appended claims.

What is claimed is:

1. A method of growing marine fish in freshwater, comprising:
   a) adding at least one Polyvalent Cation Sensing Receptor (PVCR) modulator to freshwater in an amount sufficient to increase expression and/or sensitivity of at least one PVCR;
   b) transferring the marine fish to the freshwater, modified according to step a); and
   c) adding feed for fish consumption to the modified freshwater, wherein the feed contains an amount of NaCl sufficient to contribute to a significant increased level of said PVCR modulator in serum of the marine fish.

2. The method of claim 1, wherein the PVCR modulator is selected from the group consisting of a divalent cation, a trivalent cation, an aminoglycoside, a organic polycation, an amino acid, a Type I Calcimimetic, a Type II Calcimimetic, 1,25 dihydroxyvitamin D, a cytokine, and macrophage chemotatic peptide-1.

3. The method of claim 2, wherein the feed contains at least about 1% NaCl by weight.

4. A method of transferring marine fish to freshwater, comprising:
   a) adding at least one Polyvalent Cation Sensing Receptor (PVCR) modulator to the freshwater in an amount sufficient to increase expression and/or sensitivity of at least one PVCR;
   b) transferring the marine fish to the freshwater, modified according to step a); and
   c) adding feed for fish consumption to the modified freshwater, wherein the feed contains at least about 1% NaCl by weight.

5. The method of claim 4, wherein the PVCR modulator is a PVCR agonist.

6. The method of claim 5, wherein the PVCR agonist is selected from the group consisting of a divalent cation, a trivalent cation, an aminoglycoside, an organic polycation and an amino acid.

7. A method of growing marine fish in freshwater, comprising:
   a) assessing freshwater to determine the level of at least one PVCR modulator;
   b) based on the level determined in step a), adding said PVCR modulator to the freshwater in an amount sufficient to increase expression and/or sensitivity of at least one PVCR;
   c) transferring the marine fish to the freshwater, modified according to step b); and
   d) adding feed for fish consumption to the modified freshwater, wherein the feed contains an amount of NaCl sufficient to contribute to a significant increased level of said PVCR modulator in serum of the marine fish.

8. The method of claim 7, wherein the PVCR modulator assessed is selected from the group consisting of calcium and magnesium.

9. The method of claim 8, wherein the freshwater has between about 0.3 mM and 10.0 about mM calcium and between about 0.5 mM and about 10.0 mM magnesium prior to transferring marine fish.

10. A method of growing marine fish in freshwater having between about 0.3 mM and about 10.0 mM of calcium and between about 0.5 mM and 10.0 mM of magnesium, the method comprising adding feed to the freshwater wherein the feed contains an amount of NaCl sufficient to contribute to a significant increased level of said PVCR modulator in serum of the marine fish; wherein increased expression of at least one PVCR occurs.

11. The method of claim 10, wherein the feed contains at least about 1% NaCl by weight.

12. A method of transferring marine fish to freshwater, comprising:
   a) transferring the marine fish to freshwater having magnesium and calcium in the freshwater in amounts sufficient to increase expression and/or sensitivity of at least one PVCR, and
   b) adding feed to the freshwater, wherein the feed contains at least about 1% NaCl by weight.

13. A method of growing flounder in freshwater, comprising:
   a) transferring the flounder to freshwater having at least one PVCR modulator in an amount sufficient to increase expression and/or sensitivity of at least one PVCR;
   b) adding feed for fish consumption to the freshwater, wherein the feed contains an amount of NaCl sufficient to contribute to a significant increased level of said PVCR modulator in serum of the flounder.

14. The method of claim 13, wherein the PVCR modulator is selected from the group consisting of a divalent cation, a trivalent cation, an aminoglycoside, a organic polycation, an amino acid, a Type I Calcimimetic, a Type II Calcimimetic, 1,25 dihydroxyvitamin D, a cytokine, and macrophage chemotatic peptide-1.

15. The method of claim 14, wherein the feed comprises at least about 1% NaCl by weight.

16. A kit for growing marine fish in freshwater, comprising:
   a) an aquatic mixture for providing an environment to grow the marine fish, wherein the aquatic mixture comprises at least one PVCR modulator; and
   b) an aquatic food composition containing a concentration of NaCl between about 10,000 mg/kg and about 100,000 mg/kg.

* * * * *